US009770825B2

(12) United States Patent
Goldenberg et al.

(10) Patent No.: US 9,770,825 B2
(45) Date of Patent: Sep. 26, 2017

(54) MODULAR MOBILE ROBOT

(71) Applicant: ENGINEERING SERVICES INC., Toronto (CA)

(72) Inventors: Andrew A. Goldenberg, Toronto (CA); Jun Lin, Toronto (CA)

(73) Assignee: ENGINEERING SERVICES INC., Toronto, ON (CA)

( * ) Notice: Subject to any disclaimer, the term of this patent is extended or adjusted under 35 U.S.C. 154(b) by 0 days.

(21) Appl. No.: 14/671,638

(22) Filed: Mar. 27, 2015

(65) Prior Publication Data

US 2015/0306764 A1 Oct. 29, 2015

Related U.S. Application Data

(63) Continuation of application No. 13/560,692, filed on Jul. 27, 2012, now abandoned.

(51) Int. Cl.
| G06F 19/00 | (2011.01) |
| B25J 9/08 | (2006.01) |
| B62D 55/075 | (2006.01) |
| B62D 55/24 | (2006.01) |
| B62D 55/26 | (2006.01) |
| B25J 5/00 | (2006.01) |
| B25J 11/00 | (2006.01) |

(52) U.S. Cl.
CPC ............... *B25J 9/08* (2013.01); *B25J 5/005* (2013.01); *B25J 11/002* (2013.01); *B62D 55/075* (2013.01); *B62D 55/244* (2013.01); *B62D 55/26* (2013.01); *Y10S 901/01* (2013.01); *Y10S 901/31* (2013.01)

(58) Field of Classification Search
None
See application file for complete search history.

(56) References Cited

U.S. PATENT DOCUMENTS

| 3,166,138 A | 1/1965 | Dunn, Jr. |
| 3,489,236 A | 1/1970 | Goodwin |

(Continued)

FOREIGN PATENT DOCUMENTS

| CA | 2555455 | 2/2007 |
| CN | 101293539 | 10/2008 |
| JP | 2005-111595 | 4/2005 |

*Primary Examiner* — John R Olszewski
*Assistant Examiner* — James M McPherson
(74) *Attorney, Agent, or Firm* — Hill & Schumacher

(57) ABSTRACT

A mobile robot system includes a plurality of mobile robots. Each robot has a predetermined size of large, medium, small or back-packable. The mobile robot includes a chassis, drive system components, power components, a main processor, a communication system and a power and data distribution system. The chassis has a predetermined size of large, medium, small or back-packable. Drive system components are operably attached to the chassis and power components are operably connected to the drive system components and the power and data distribution system. The main processor, the communication system and the power and data distribution system are all operably connected together and operably connected to the traction components and the power components. The main processor, the communication system, and the power and data distribution system are all configured for use with the predetermined size of the chassis and at least one other size.

18 Claims, 38 Drawing Sheets

(56) References Cited

U.S. PATENT DOCUMENTS

| | | |
|---|---|---|
| 4,483,407 A | 11/1984 | Iwamoto et al. |
| 4,621,562 A | 11/1986 | Carr et al. |
| 4,709,773 A | 12/1987 | Clement et al. |
| 4,932,491 A | 6/1990 | Collins, Jr. |
| 4,932,831 A | 6/1990 | White et al. |
| 4,977,971 A | 12/1990 | Crane, III et al. |
| 5,022,812 A | 6/1991 | Coughlan et al. |
| 5,413,454 A | 5/1995 | Movsesian |
| 5,435,405 A | 7/1995 | Schempf et al. |
| 5,451,135 A | 9/1995 | Schempf et al. |
| 5,550,953 A | 8/1996 | Seraji |
| 5,884,718 A | 3/1999 | Yamashiro et al. |
| 6,113,343 A | 9/2000 | Goldenberg et al. |
| 6,233,502 B1 | 5/2001 | Yim |
| 6,263,989 B1 | 7/2001 | Won |
| 6,431,296 B1 | 8/2002 | Won |
| 6,484,083 B1 * | 11/2002 | Hayward ............ B60D 1/00 180/24.05 |
| 6,668,951 B2 | 12/2003 | Won |
| 6,814,169 B2 * | 11/2004 | Moore ............ B62D 57/024 180/9.21 |
| 6,889,783 B1 * | 5/2005 | Moore ............ B62D 57/024 180/9.21 |
| 7,348,747 B1 | 3/2008 | Theobold et al. |
| 7,493,976 B2 | 2/2009 | Goldenberg et al. |
| 7,600,592 B2 | 10/2009 | Goldenberg et al. |
| 7,654,348 B2 | 2/2010 | Ohm et al. |
| 7,784,570 B2 | 8/2010 | Couture et al. |
| 7,874,386 B2 | 1/2011 | Ben-Tzvi et al. |
| 7,891,446 B2 | 2/2011 | Couture et al. |
| 8,108,092 B2 | 1/2012 | Phillips et al. |
| 8,360,178 B2 | 1/2013 | Goldenberg et al. |
| 8,620,489 B2 | 12/2013 | Sanchez et al. |
| 2003/0147725 A1 * | 8/2003 | Glass ............... B01D 21/245 414/8 |
| 2007/0209844 A1 | 9/2007 | Kamimura |
| 2008/0184840 A1 | 8/2008 | Novoplanski et al. |
| 2008/0277172 A1 * | 11/2008 | Ben-Tzvi ............ B25J 5/005 180/9.1 |
| 2008/0296853 A1 | 12/2008 | Langford et al. |
| 2009/0079839 A1 * | 3/2009 | Fischer ............... G01S 7/003 348/218.1 |
| 2009/0145671 A1 * | 6/2009 | Filippov ............. B25J 5/005 180/9.42 |
| 2010/0116566 A1 * | 5/2010 | Ohm ................. B25J 5/005 180/8.2 |
| 2011/0040427 A1 | 2/2011 | Ben-Tzvi |
| 2011/0168460 A1 * | 7/2011 | Goldenberg .......... B25J 5/005 180/9.3 |
| 2012/0185091 A1 * | 7/2012 | Field ............... G05D 1/0044 700/254 |
| 2012/0211287 A1 | 8/2012 | Andrus et al. |

* cited by examiner

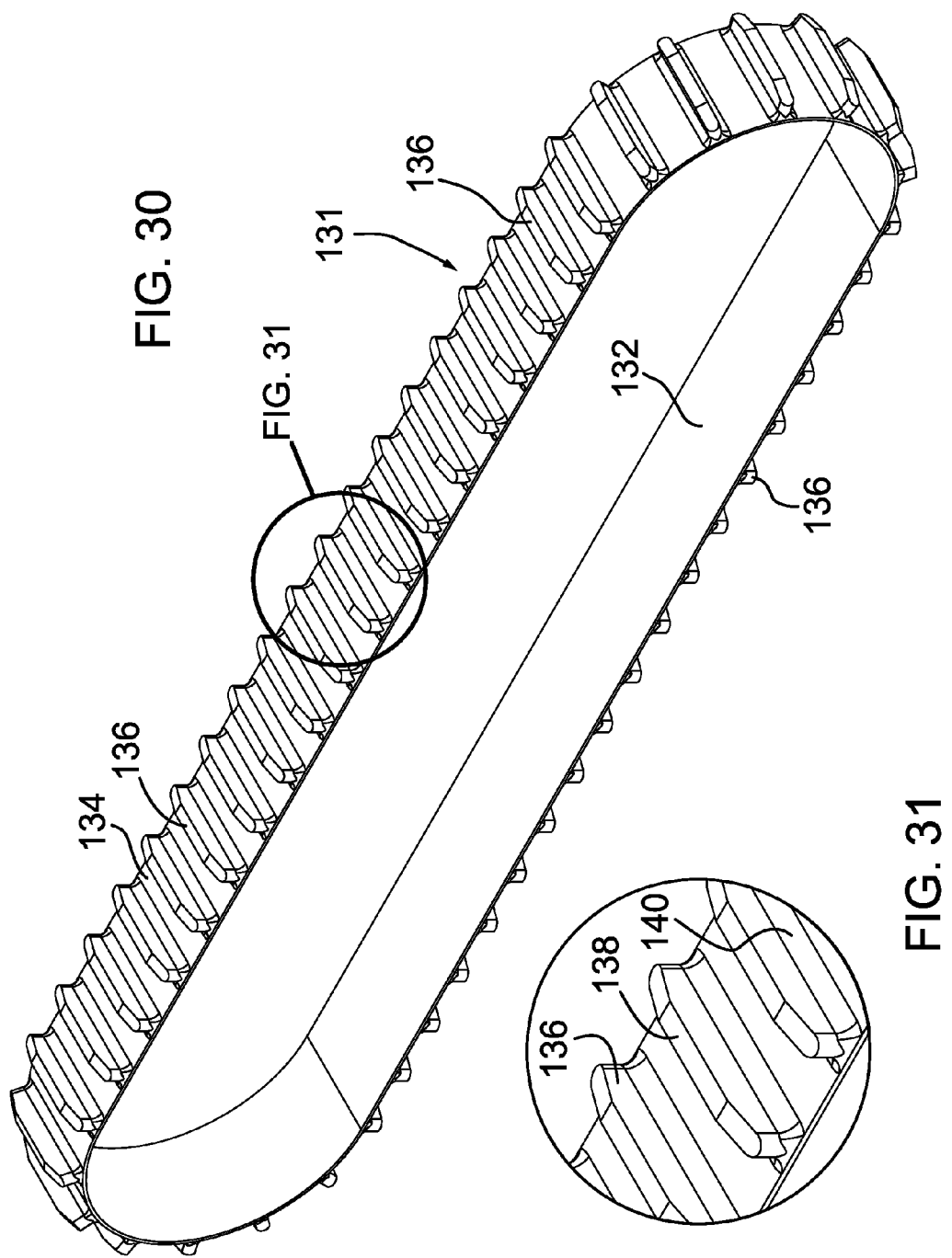

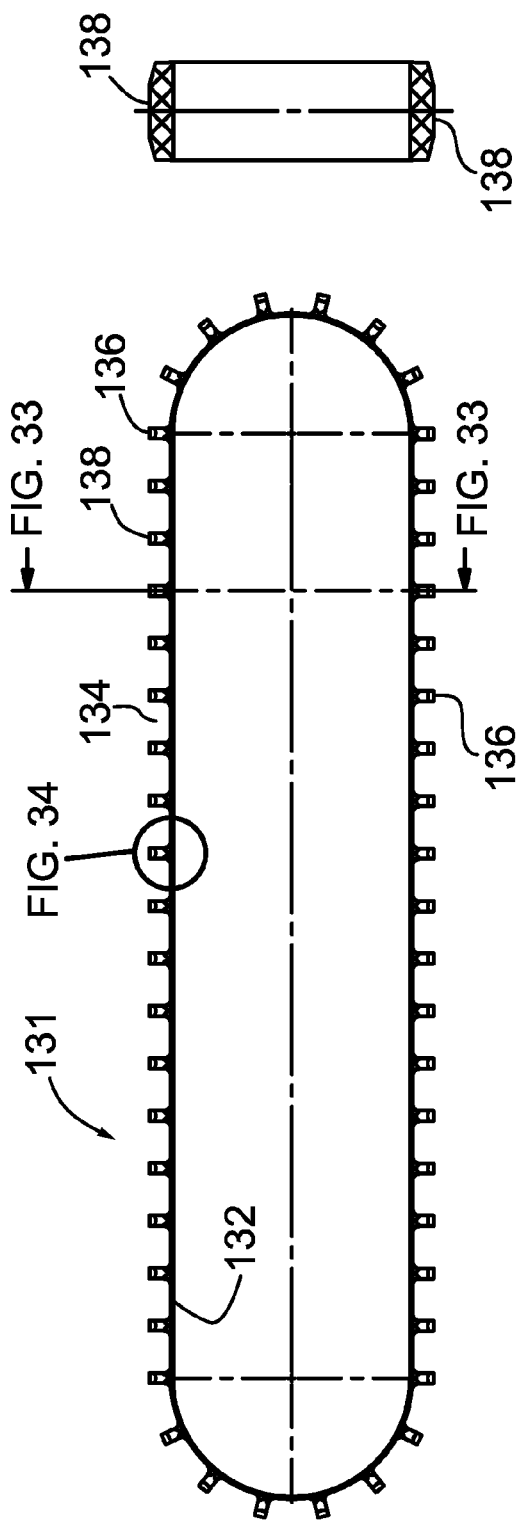
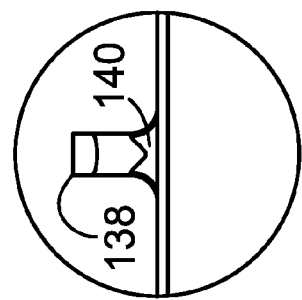
FIG. 32
FIG. 33
FIG. 34

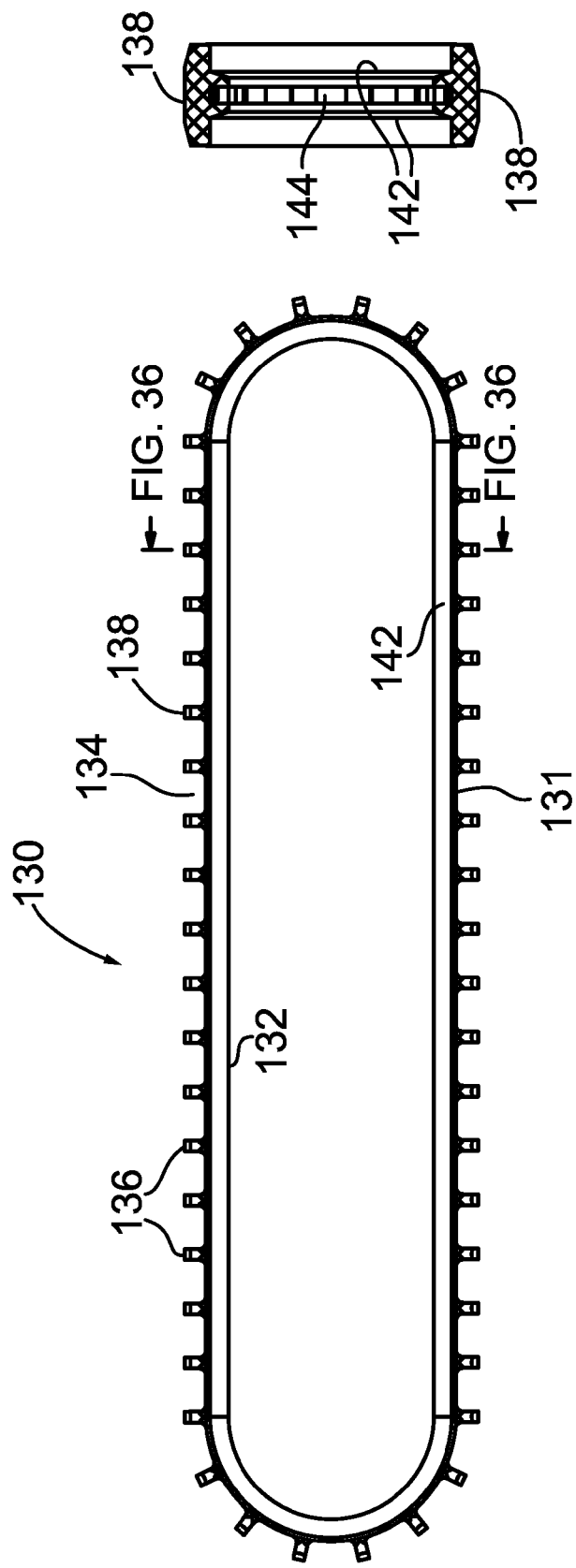

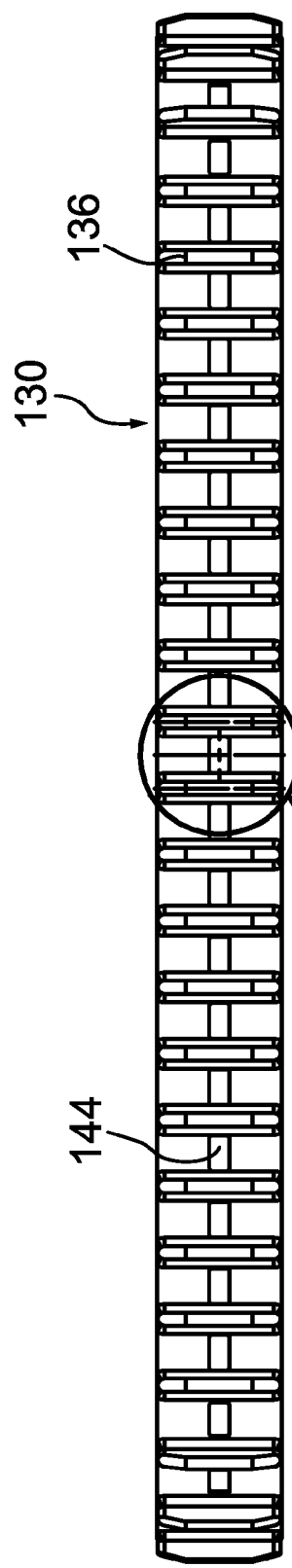
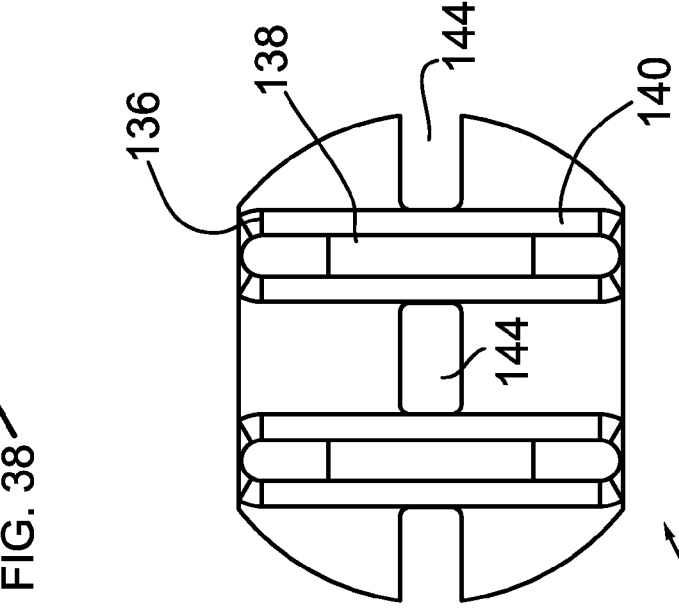
FIG. 37
FIG. 38

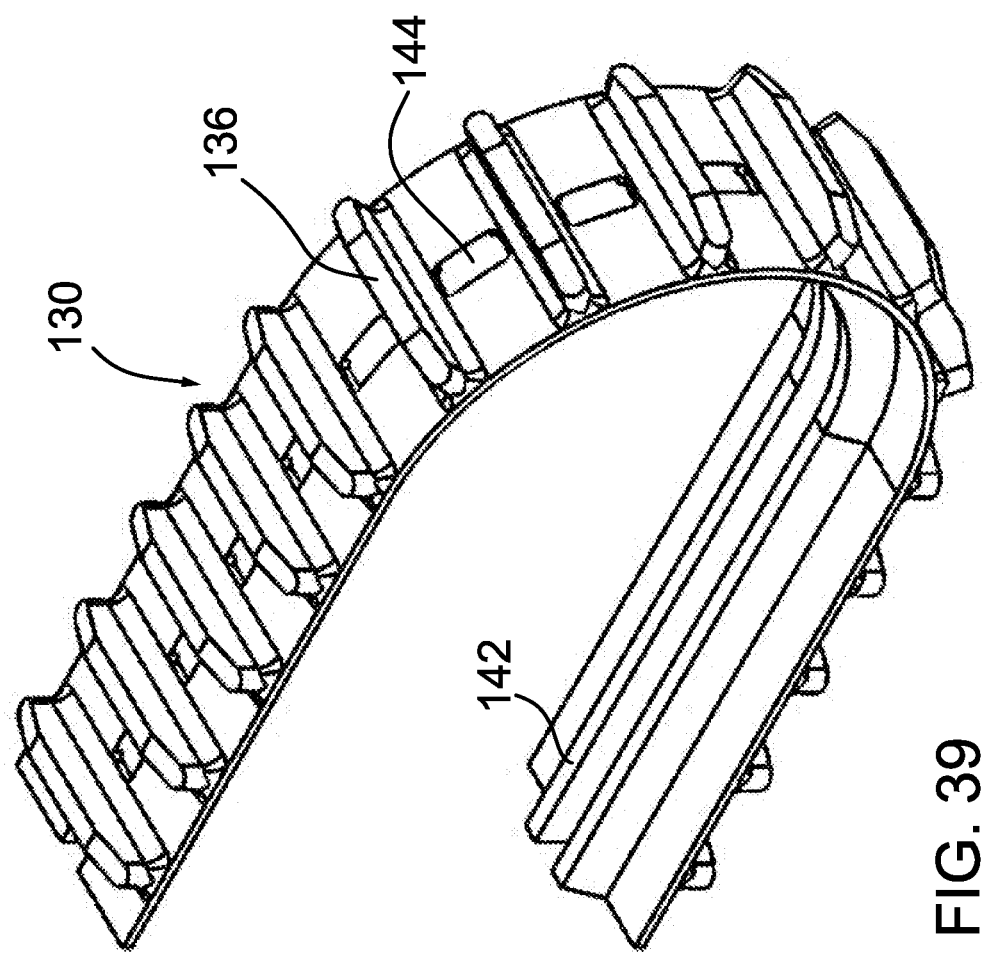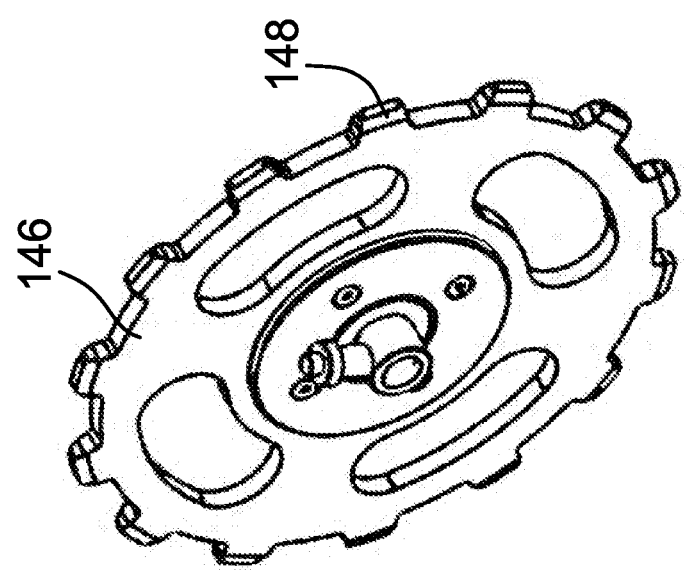
FIG. 39

_US 9,770,825 B2_

MODULAR MOBILE ROBOT

FIELD OF THE DISCLOSURE

This disclosure relates to mobile robots and in particular modular mobile robots that have modules that may be easily removed and replaced, may be interchanged for different modules or may be interchanged between different sized mobile robots. As well, the disclosure relates to an endless track, a flexible tail and a single scoop arm.

BACKGROUND OF THE DISCLOSURE

Mobile robots are well known and used routinely by military, law enforcement and security forces. As such they are often used in hazardous situations and in stand-off (remote) locations. Accordingly it would be very useful to provide a mobile robot that can be easily adapted for different uses. As well, it would be useful to provide a mobile robot that is easily serviced. Accordingly a modular mobile robot would be advantageous. As well, it would be advantageous if at least some of the modules were interchangeable between different sized mobile robots to suit particular or unique missions.

Some modular robots have been suggested. For example a U.S. patent application Ser. No. 12/316,311 that was published on Jan. 13, 2011. This application shows a mobile robot with right and left track modules. However, the rest of the robot does not appear to be modular and therefore if other than the rack modules needed repair or replacement the robot would likely be out of the field until such work could be done.

Mobile robots are often used for specific tasks and have specific weight and operational requirements for those tasks. For example mobile robots are used in space exploration wherein the weight of the robot may be critical to the mission. In stand-off operations having an arm that can pick up hazardous objects may be useful for such missions.

Mobile robots often include endless tracks, particularly mobile robots for use in unknown terrains or for use in climbing stairs and slopes, or navigating obstacles. Endless tracks, which are usually formed of a belt with a number of cleats disposed transversely to the belt's longitudinal direction, are the ground-contacting portion of some common drive systems for mobile robots. Due to their high traction compared to wheels, endless tracks have found application in many fields, such as mobile robotics, farming, and construction. Further, drive systems employing endless tracks can provide a more versatile set of capabilities than wheeled systems, for tasks such as navigation over rough terrains and obstacle climbing.

However, current tracks have a number of drawbacks. For instance, they can experience more friction than wheels and thus require more power to drive, and may cause vibrations when moving and turning. Further, they may slip off the wheel or sprocket pulley which drives them, possibly damaging the track or the drive mechanism. If this happens in a hazardous situation where the robot is being operated remotely, it may be rendered inoperable. The wheel driving them may also occasionally rotationally slip within the track, causing a loss of locomotive force.

In addition, mobile robots are often deployed in environments whose surface characteristics are unknown a priori, and may be very uneven, irregular or bumpy. In such situations, the probability of the robot falling over after losing its balance can be quite high. For situations where the robot is being operated remotely in a hazardous situation, falling over can render the robot inoperable. Furthermore, it may be required that the mobile robot has the capability to climb obstacles, which is generally a risky task as it can quite easily lead to the robot tipping over.

Therefore, it would be advantageous to provide a device that overcomes the aforementioned difficulties.

SUMMARY

A mobile robot system includes a plurality of mobile robots. Each mobile robot is for use with a control unit and each mobile robot has a predetermined size that is one of large, medium, small and back-packable. The back-packable robot is generally up to 60 by 35 cm with a weight without payload of up to generally 15 kg; the small robot is larger than and heavier than the back-packable robot; the medium robot is larger than and heavier than the small robot; and the large robot is larger than and heavier than the medium robot. Each mobile robot includes a chassis, drive system components, power components, a main processor, a communication system, a power and data distribution system. The chassis has a predetermined size that is one of large, medium, small and back-packable. Drive system components are operably attached to the chassis and have a predetermined size that is configured for use with the predetermined size of the chassis. Power components are operably connected to the power and data distribution system and operably connected to the drive system components and the power components have a predetermined size that is configured for use with the drive system components. The main processor is operably connected to the drive system components, the power and data distribution a system, and the power components. The communication system is operably connected to the drive system components, the power components and the main processor. The communication system is for communicating with the operator control unit. The power and data distribution system is operably connected to the drive system components, the power components, the main processor and the communication system. At least one of the main processor, the communication system, and the power and data distribution system are all configured for use with the predetermined size of the chassis and at least one other size such that it is interchangeable therebetween.

The main processor, communication system and the power and data distribution system may be interchangeably useable in the large, medium, small and back-packable mobile robots.

The drive system components may include drive traction modules operably connected to drive transmission modules.

The drive system components may further include a flipper module operably connected to flipper transmission modules. The drive transmission modules may be one of long track traction modules, short track traction modules, or wheel traction modules.

The mobile robot may further include a core module and the main processor and communication system may be part of the core module.

The mobile robot may include a head module and the power and data distribution may be part of the head module.

The core module and the head module may be interchangeably useable in the large, medium, small and the back-packable mobile robots.

The mobile robot may include one of a large gripper arm module, a small gripper arm module and a tooling arm. The mobile robot may further include a PTZ arm module. The mobile robot may further include a camera and the camera may be interchangeably attachable to the PTZ arm module, the large gripper arm module and the small gripper arm module.

The mobile robot may include a turret attachable to one of the large gripper arm and the small gripper arm. Further, a turret may attachable to the PTZ arm module.

The mobile robot may include weaponry that is interchangeably useable in the large, medium, small and back-packable mobile robots.

The control unit may be interchangeably useable in the large, medium, small and back-packable mobile robots.

The control unit may be one of an operator controlled unit and an autonomously controlled unit.

The power component may be interchangeable useable with predetermined sized chassis smaller than the predetermined size chassis of the compatible power component.

The large robot may be generally up to 139 by 66 cm with a weight without payload of up to generally 250 kg. The medium robot may be generally up to 98 by 50 cm with a weight without payload of up to generally 125 kg. The small robot may be generally up to 71 by 54 cm with a weight without payload of up to generally 125 kg.

A modular mobile robot for use in association with a control unit includes a chassis, drive traction modules, drive transmission modules, a self-contained head module, a self-contained power module, and a self-contained core module. The drive traction module is operably attached to the chassis. The drive transmission module is operably connected to the drive traction module. The self-contained head module includes a power and data distribution system and the head module is operably connected to the drive transmission module. The self-contained power module is operably connected to the head module. The self-contained core module is operably connected to the head module. The self-contained core module includes a main processor and communication system, whereby the core module manages the communication with the control unit.

The modular mobile robot may further includes flipper modules operably connected to flipper transmission modules.

The drive traction modules may be one of long track traction modules, short track traction modules, and wheel traction modules. The modular mobile robot may further include one of a large gripper arm module and a small gripper arm module. The modular mobile robot may further include a tooling arm. The modular mobile robot may further include a PTZ arm module.

A tooling arm includes a housing, a drive system, a lead screw and a nut assembly, and a scoop assembly. The lead screw and nut assembly is operably connected to the drive system such that rotation of the nut drives the lead screw upwardly and downwardly relative to the housing. The scoop assembly is operably connected to the lead screw. The scoop assembly has an open position and a closed position and movement of the lead screw downwardly responsively moves the scoop assembly from the open position to the closed position.

The scoop assembly may act as a four bar link mechanism.

The scoop assembly may include a pair of scoops, a pair of links and a shuttle, each scoop pivotally may be attached to the shuttle, each link may be pivotally attached at one end thereof to a bracket and the other end thereof to one of the pair of scoops.

The bracket may be attached to a lower end of the lead screw. The shuttle may include a stopper which engages a block connected to the housing.

The drive system may include a motor and gear head assembly. The housing may include an upper mounting plate and the motor and the gear head assembly may be attached thereto.

The lead screw and the nut assembly may include a guide tube having a slot therein and the lead screw may include a screw pin extending through the lead screw and its motioning is limited by the slot.

The housing may include an upper mounting plate and the motor and the gear head assembly may be attached thereto.

An endless track includes a belt, a plurality of chamfered cleats, a plurality of holes and a dual v-guide. The belt has an inner surface and an outer surface. The plurality of chamfered cleats, each have a contact surface. The chamfered cleats are attached to the outer surface defining an attachment area, and the contact surface is shaped such that when the track is laid on a flat solid surface, each chamfered cleat contacts the flat solid surface with less area than the attachment area. The plurality of holes in the belt are disposed between the chamfered cleats and are shaped to allow teeth of a drive sprocket pulley to pass through and to engage the belt for transmitting force from the sprocket pulley to the belt. The dual v-guide includes two elongate, parallel protrusions which are spaced laterally from each other and are attached to the inner surface.

Each of the plurality of chamfered cleats may have a substantially rectangular cross section in a plane perpendicular to the lateral direction to the track.

Each of the plurality of chamfered cleats may attach to the outer surface at a fillet. Each of the plurality of chamfered cleats may be integrally formed with the belt.

Each of the plurality of chamfered cleats may have a rubber cover. The holes may be substantially rectangular.

The two elongate parallel protrusions may extend around the belt. The two elongate parallel protrusions of dual v-guide may be first two elongate parallel protrusions, and further including at least a second two elongate parallel protrusions. The first and second two elongate parallel protrusions may have rounded edges. The first and at least a second two elongate parallel protrusions may be spaced longitudinally such that the drive sprocket pulley, in operation, is always contacted by at least a portion of the first and second two elongate parallel protrusions.

The belt may be made of nylon. The dual v-guide may be made of polyurethane. The plurality of chamfered cleats may be made of rubber or polyurethane.

A mobile robot includes a deployment mechanism and a flexible tail. The flexible tail is attached to the deployment mechanism and extends outwardly from the mobile robot in a deployment direction. Actuation of the deployment mechanism moves the flexible tail and changes the deployment direction of the flexible tail.

The deployment mechanism may be a rotational deployment mechanism, and actuation of the rotational deployment mechanism rotates the flexible tail.

The flexible tail may rotate about an axis parallel to the lateral direction to the robot. Alternatively, the flexible tail may rotate about an axis parallel to the upward direction from the robot.

Further features of the mobile robot will be described or will become apparent in the course of the following detailed description.

BRIEF DESCRIPTION OF THE DRAWINGS

The mobile robot will now be described by way of example only, with reference to the accompanying drawings, in which:

FIG. 30 is a perspective view of an embodiment of the belt with rubber cover;

FIG. 31 is an enlarged perspective view of a portion of the belt with rubber cover with cleats shown in FIG. 30;

FIG. 32 is a side view of the belt with rubber cover of FIG. 30;

FIG. 33 is a sectional view of the belt with rubber cover of FIG. 30 taken through one of the cleats;

FIG. 34 is an enlarged side view of one of the cleats of the belt with rubber cover of FIG. 30;

FIG. 35 is a side of another embodiment of the track;

FIG. 36 is a sectional view of the track of FIG. 35 taken through one of the cleats;

FIG. 37 is a top view of the track of FIG. 35;

FIG. 38 is an enlarged top view of a portion of the track of FIG. 35;

FIG. 39 is a blown apart perspective view of a portion of the track of FIG. 35 with a sprocket pulley;

DETAILED DESCRIPTION

The systems described herein are directed, in general, to modular mobile robots, to interchangeable features for use therein, to a tooling arm for use therewith, to an endless track for use therewith and to a flexible tail. Although embodiments of the mobile robot are disclosed herein, the disclosed embodiments are merely exemplary. Furthermore, the Figures are not drawn to scale and some features may be exaggerated or minimized to show details of particular features while related elements may have been eliminated to prevent obscuring novel aspects. Therefore, specific structural and functional details disclosed herein are not to be interpreted as limiting but merely as a basis for the claims and as a representative basis for enabling someone skilled in the art to a mobile robot.

Figure 1:
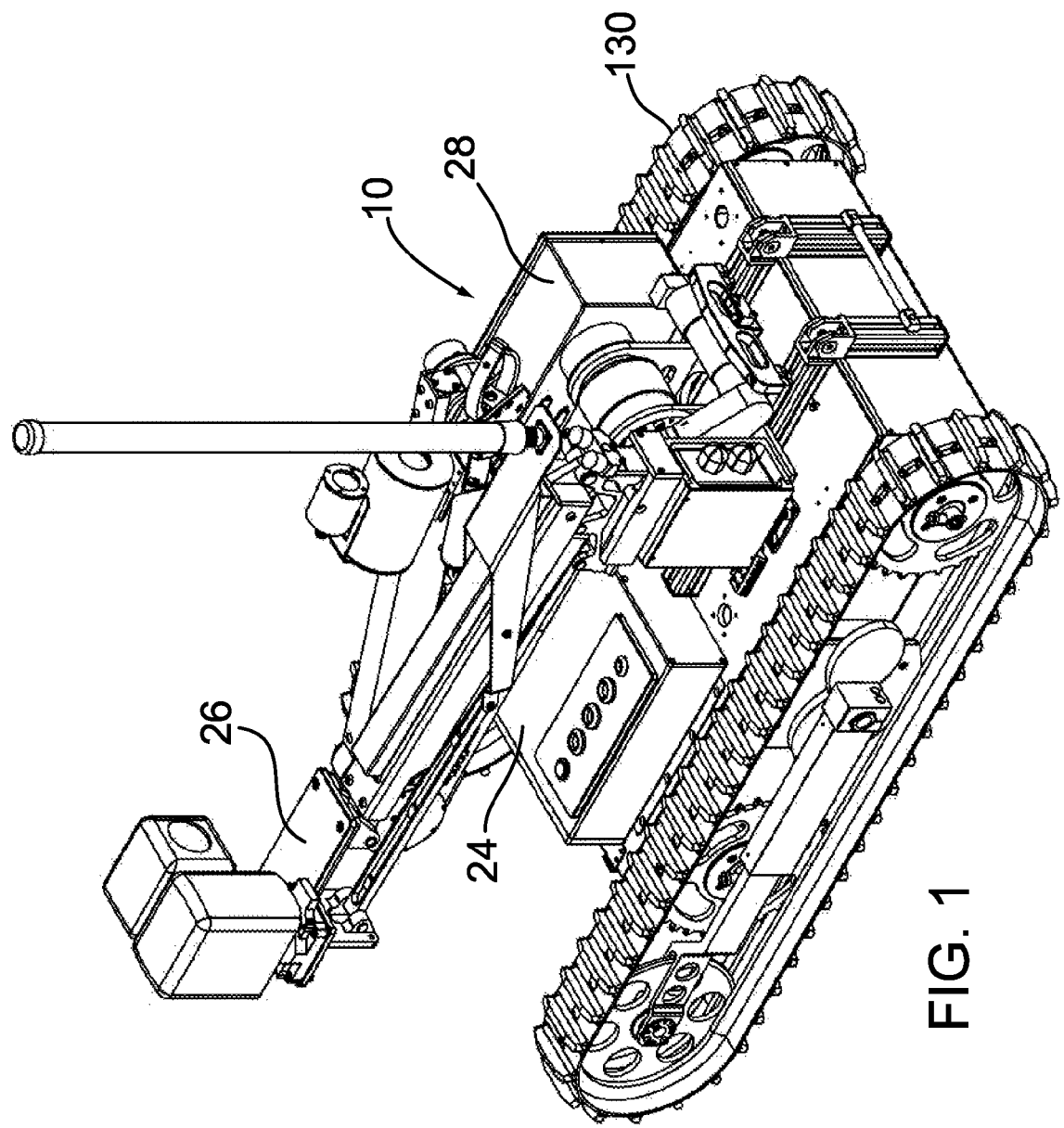
FIG. 1 is a perspective view of a modular mobile robot.
Figure 2:
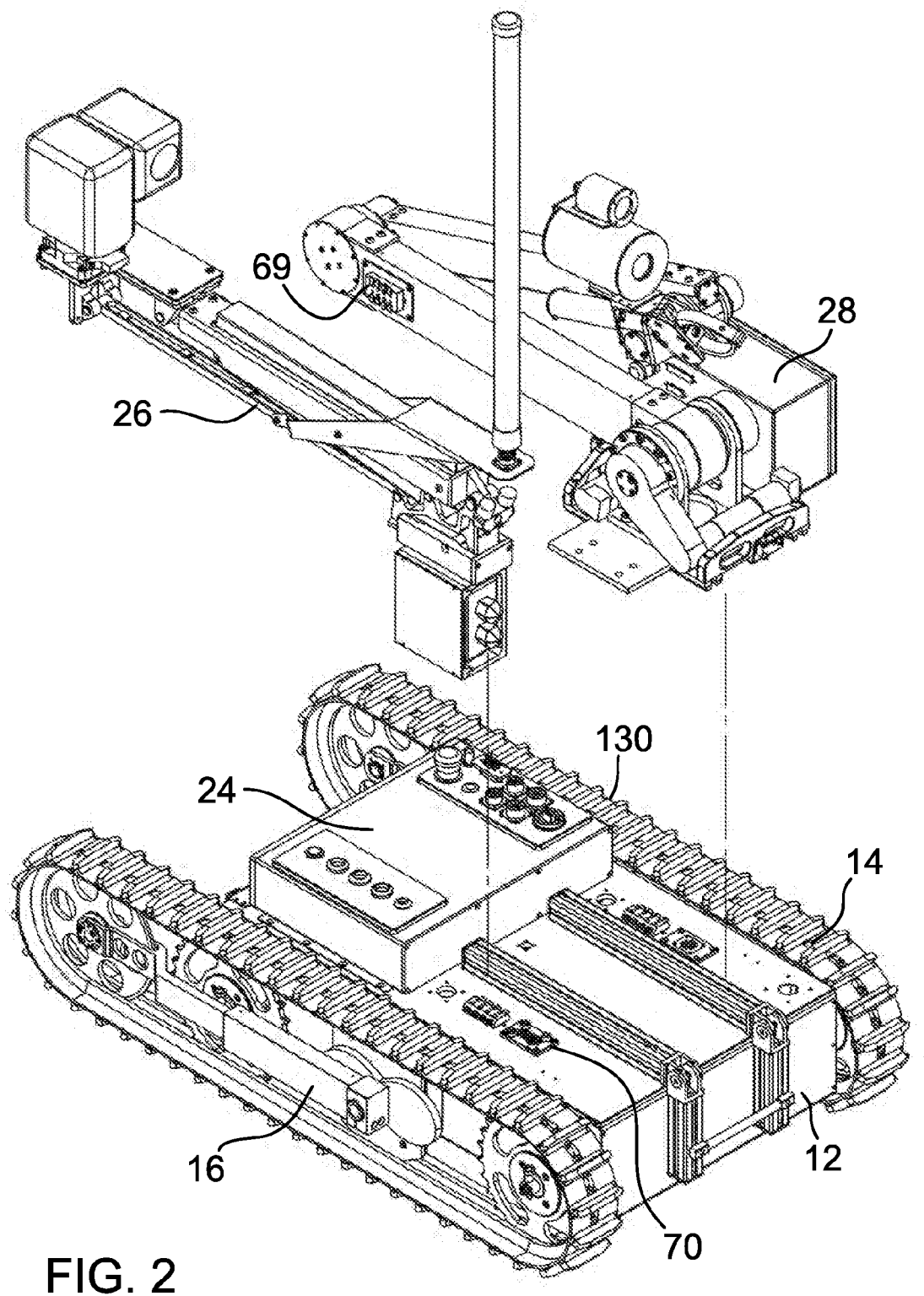
FIG. 2 is a partially blown apart view of the modular mobile robot of FIG. 1.

Referring to FIGS. 1 and 2 an embodiment of the modular mobile robot is shown generally 10. Mobile robot 10 has a number of features that are modular. As well, some of the modules or components are interchangeable between mobile robots of different sizes.

Figure 3:
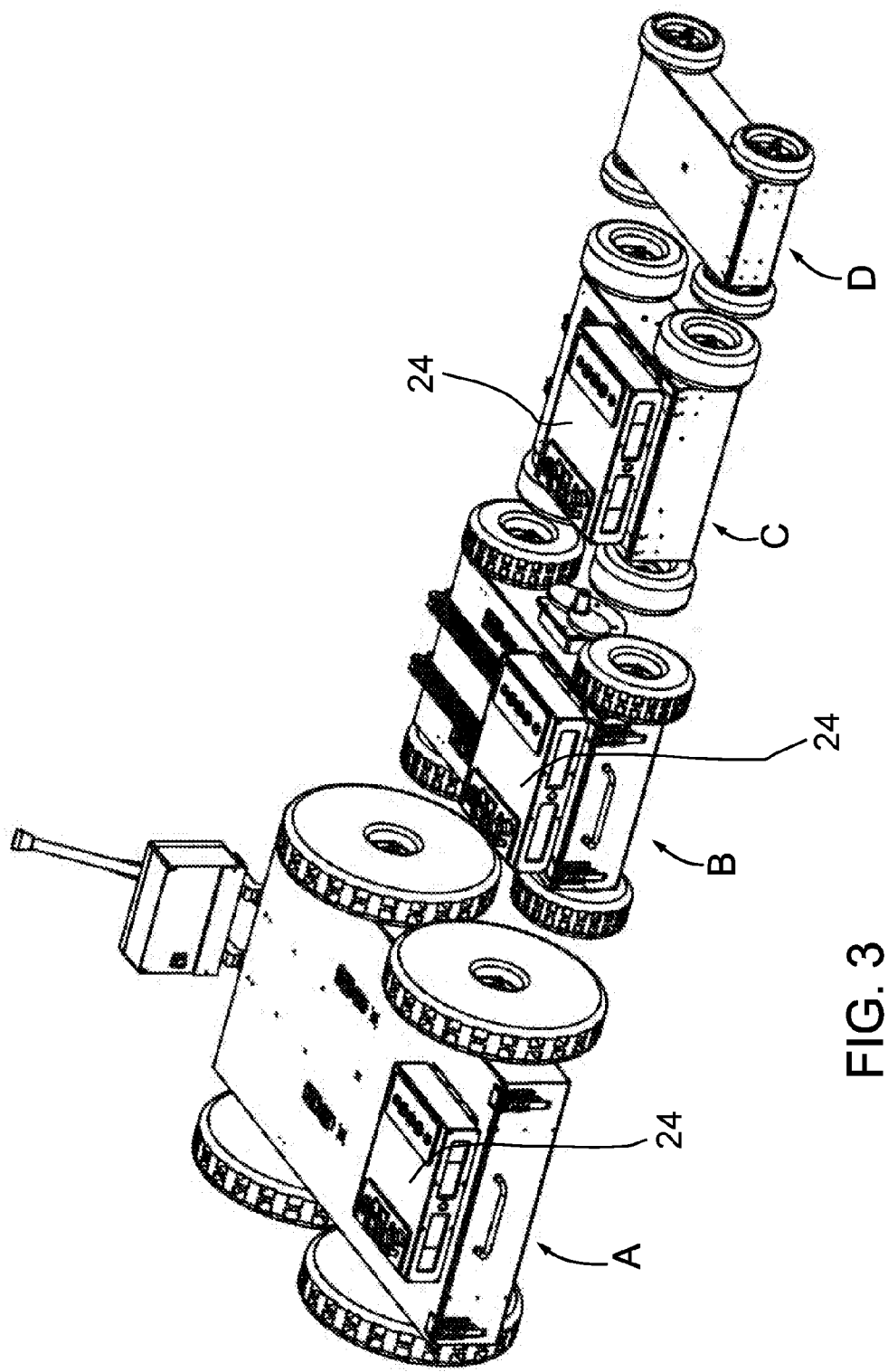
FIG. 3 is a perspective view of (a) large, (b) medium, (c) small and (d) back-packable mobile robots.
Figure 4:
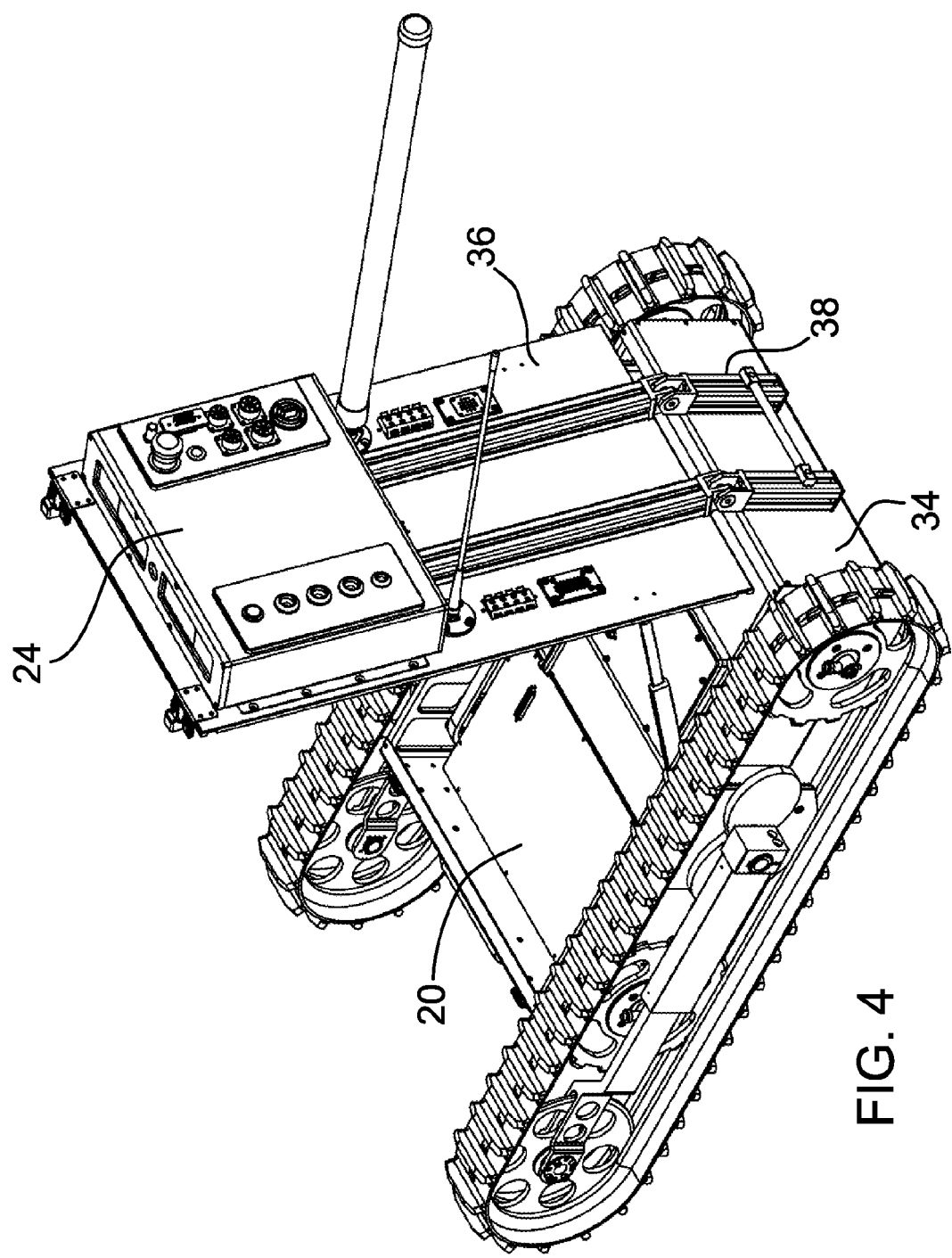
FIG. 4 is a perspective view of the chassis portion of the modular mobile robot of FIGS. 1 and 2.
Figure 5:
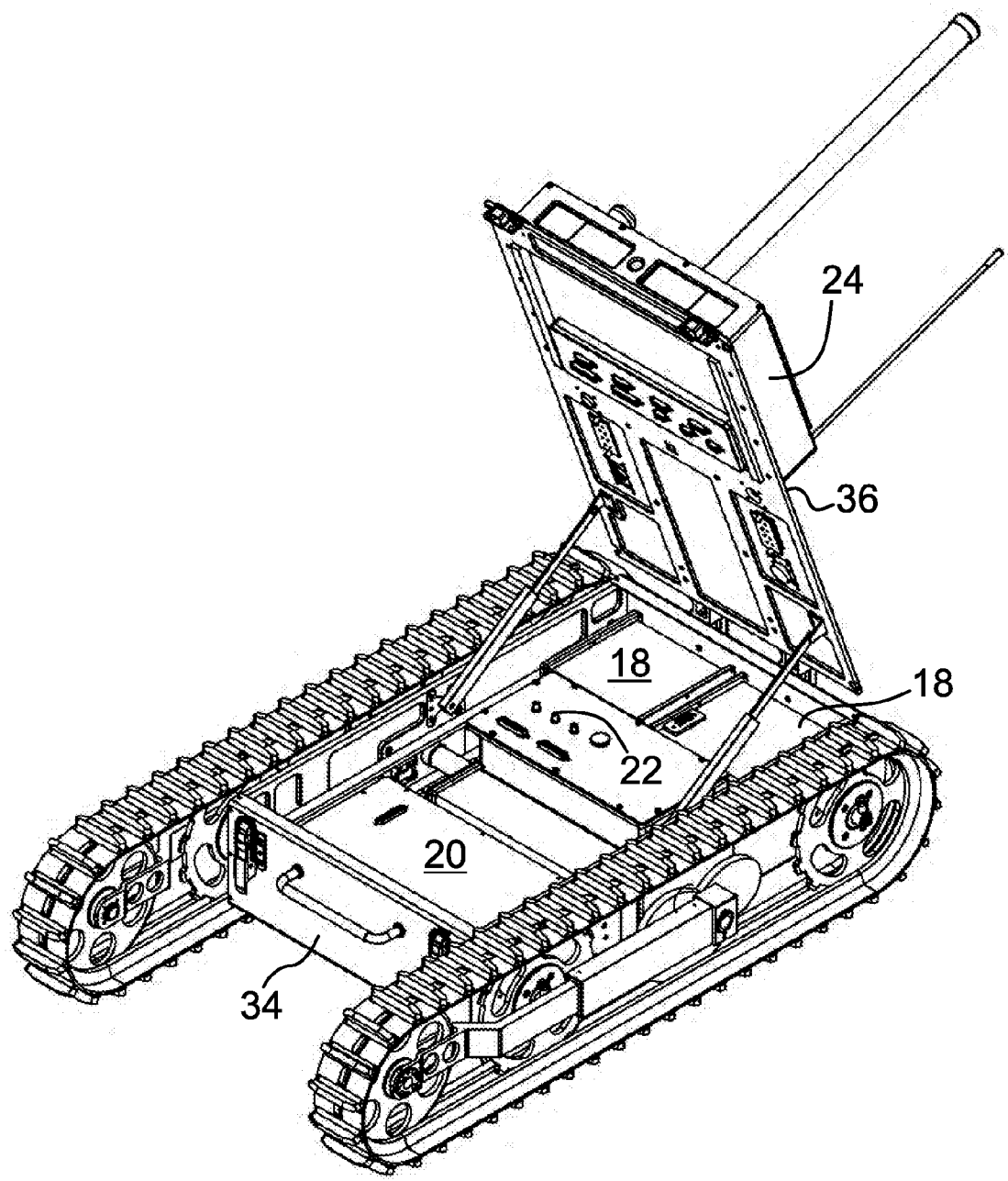
FIG. 5 is a perspective view of the chassis portion of the modular mobile robot similar to the view shown if FIG. 4 but shown an alternate perspective.

Mobile robots that have interchangeable components are particularly useful for a user that has a big fleet of mobile robots. By having modules that are useable in different sized mobile robots it keeps in reserve a series of different components that are useable in different robots, thus making it easier to keep the fleet running. In many fleets there are multiple sizes of mobile robots. By way of example as shown in FIG. 3 there may be a large robot FIG. 3(a), a medium sized robot FIG. 3(b), a small robot FIG. 3 (c) and a robot that fits into a backpack FIG. 3 (d). By way of example only the large robot may be L×W×H 139×66×78 cm with a weight of 250 kg, the medium robot 98×50×82 cm with a weight without payload of 125 kg, the small robot 71×54×50 cm with a weight of 60 kg and the back-packable robot 60×35×23 cm with a weight of 15 kg. Typically the large and medium robots are used for neutralization and handling of large payloads; the small robot can be used for reconnaissance and handling of small payloads; the backpackable can be used for surveillance and reconnaissance.

Components that may be interchangeable between robots of two or more sizes are the control unit, communication components, electronics components, power components, external sensors, internal sensors, cameras and weaponry. The communication components and a main processor may form part of a self-contained core module which may be interchangeable between different sized robots. Power and data distribution system may form part of a self-contained head module which may be interchangeable between different sized robots. A self-contained power module may be downwardly configured for use with different robots meaning that if it is sized for a particular size of chassis it will work with that sized chassis and smaller chassis. In contrast external components such as a large gripper arm, small gripper arm and PTZ arm are upwardly compatible meaning that if the arm is sized for a particular size of chassis it will work with that sized chassis and larger chassis. As well, software programs that control specific tasks may be interchangeable between different sized robots. For example tasks such as auto navigation and auto grasping of tools from a tool rack would be interchangeable. As well, software that controls the driving function and software that controls the PTZ could be interchangeable. Software that controls the sensors, software for relay control, software for power distributions, software that controls weaponry where the weaponry is interchangeable and software for video selection could each be interchangeable. However, software that controls the flipper, software that controls the gripper arm and software that controls the PTZ arm would be specific to the particular size of those components.

It will be appreciated by those skilled in the art that not all of the components or modules may be interchangeable between different sized robots. Specifically the modules associated with the chassis are not interchangeable between different sized robots. More specifically the self-contained head, core, and power modules (described in more detail below) would be interchangeable. Accordingly, the components associated with the chassis, the traction, the transmissions and the power would not be interchangeable. Components such as the gripper arm, PTZ (pan, tilt and zoom) arm and tools could be upwardly compatible in that the components designed for a smaller robot could be used on a larger robot; however it is unlikely that the smaller components would provide the functionality of the larger robot.

The core module, the head module and the power module are described as being self-contained since each is contained in a housing such that it can be easily removed and replaced. The core module, the head module and the power module are complete modules, which are self-contained modules that can be easily removed and replaced in a particular robot or used in other mobile robots. More specifically in one embodiment the core module has processor, communication interface card, wireless transceiver for two-way data and audio, one-way video, DC-DC converter inside. The core module is the "brain" of the robot. It accepts task commands from the control unit and analyses and translates the task commands then issue to different modules and receives feedbacks from these modules via its multiple serial ports. It also provides Ethernet, USB, RS232, RS485, RS422 and VGA interface to users so the users can develop their own software to control the robot. The power module integrates high capacity Li-Polymer battery, DC-DC converter, and control relays. The output interface connector on the power module includes the power switch pins, the power relay coil pins, and the 12 VDC, 24 VDC, and 37 VDC output pins. The power outputs are isolated from the other modules by the power switch and power relay contacts, which means only after the power switch and power relay are on (manually or remotely), the 12 VDC, 24 VDC and 37 VDC will be output to the external. The head module in the robot accepts power input from the power module and control signal input/output from the core module and distributes power to all the different modules, including by way of example the drive transmission module, flipper module, gripper arm module, PTZ arm module, and upgrade module. The power and signal distribution is realized by hard wire inside the head module to minimize any extra processing delay. The head module also manages the cameras, lights (visible and InfraRed), picture-in-picture display, the platform disruptor and laser control, and the relay control.

As well, it is useful to have a mobile robot wherein the functionality of the robot can be changed by changing a component or a module. For example arms of different sizes may be attachable to the same robot or different end effectors may be attached to the same or different arms.

One embodiment of the mobile robot described herein is constructed of a series of modules. This makes it easy to change from a track robot to a wheel robot or from a long track robot to a short track robot. As well, when a robot is in need of repair, the robot is designed such that a module can be removed and a replacement module may be easily installed.

Mobile robot 10 as shown in FIGS. 1 and 2 is a modular mobile robot. Robot 10 includes a chassis 12, drive system components, power components, electronic components, arm components and other components to preform specific tasks.

Figure 6:
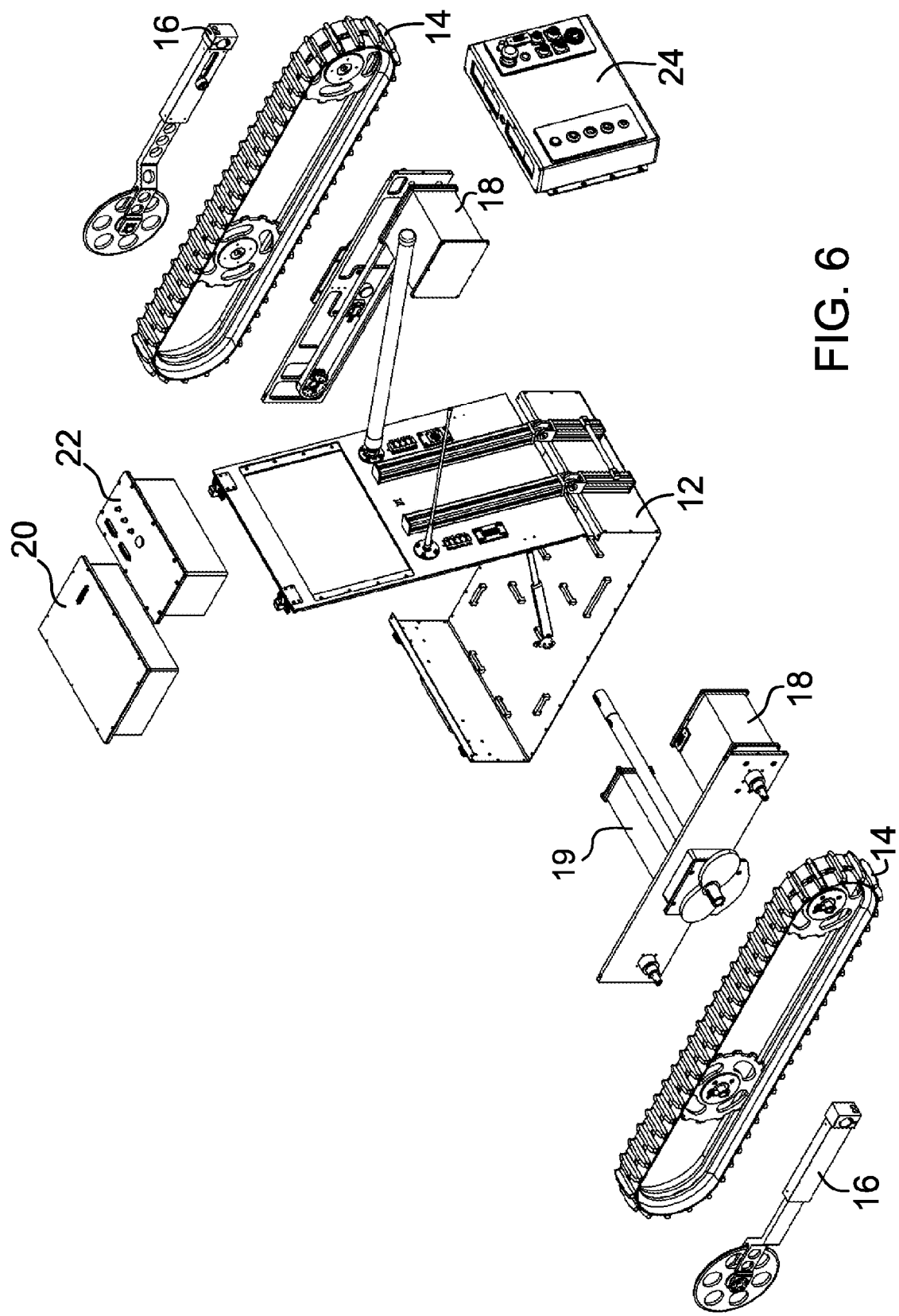
FIG. 6 is a blown apart perspective view of the chassis portion of the modular mobile robot of FIGS. 4 and 5.

The drive system components are attachable to the chassis 12. The drive system components include drive traction modules and drive transmission modules. Referring to FIG. 6, the drive module shown herein is a long track traction module 14 and it also includes a flipper module 16 and the transmission module is a drive transmission module 18 and a flipper transmission module 19. Note that mobile robot 10 will typically include the flipper transmission module 19 whether the flipper module 16 is in use or not. Thus the users can easily reconfigure the robot among a short track, long track with flipper and wheel configuration. However if the user knows that it will not be using the flipper module 16 the flipper transmission module 19 need not be used.

The power module 20 includes battery and multiple voltage DC-DC converters, and provides all the voltages and the power for the entire robot. The core module 22 includes the main processor and communication system, and manages the communication to the control unit for all the modules. It is operably connected to the other modules. The core module receives commands from the control unit and then commands the other modules. The core module controls the motion of the robot through the drive transmission module 18 and the flipper transmission module 19. The control unit (not shown) is typically situated remote from the robot. The control unit may be an operator control unit or an autonomously controlled unit. The control unit might also include a hybrid communication system that includes a relay unit.

The head module 24 is a power, data and communication distribution module, and an interface module to external sensors. The head module is operably connected to the power module 20 and to the core module 22. As well, it is operably connected to the other modules. The head module 24 distributes the power from the power module 20 and it distributes the commands from the core module 22. The head module 24 controls all aspects of the mobile robot. For example, it passes the power and operating instructions to the drive transmission module 18 and the flipper transmission module 19, as well, through another channel it transmits power and operating instructions to other components such as the gripper arm, the PTZ arm, fiber optical components. The head module 24 also distributes power such as 12V and operating instructions to internal and external sensors components and any weaponry. In the embodiment shown herein the head module 24 is configured to interface with up to two sensors with a serial communication interface. In addition, the head module 24 controls the laser pointer, disruptor and relay outputs 69 and 70 on the platform. Mounted with the head module 24 are a camera 71 and two visible 72 and IR 73 lights. The head module 24 is provided with a plurality of ports. For example there is provided a PTZ arm port 74, a gripper arm port 75, a battery charger port 30, a Wi-Fi port 32. PTZ arm port 74 and gripper arm port 75 provide the power supply, the communication and the video signals to the respective arm. The arm function is defined in its independent control box. The head module 24 also may include specific internal sensors such as a temperature sensor, a compass, an inclinometer and a battery power sensor. As well, the head module may also have sensors which may include gas sensor and environmental sensors such as chemical, biological, nuclear and explosive (CBRNE) sensors. Alternatively the CBRNE sensors may be in a separate module that is attachable to the chassis or to one of the gripper arms as a payload. These sensors may be either internal or external.

In addition, the head module includes software to control the sensors, software for relay control, software for power distribution, software for data distribution and software for video selection.

The chassis 12 is generally a box 34 with a hinged lid 36. A pair of rails 38 is attached to the outside of the chassis. The rails 38 facilitate the attachment of the components such as the gripper arm.

In the embodiment shown herein some of the modules are mechatronics modules in that they have the electronics and mechanical parts integrated. For example, the flipper transmission module 19 has motor, gear head, encoder, angular position sensor, brake, servo motor driver, transmission gear pairs, cam, mechanical structure, etc. The large gripper arm module 28 has motors, gear heads, encoders, angular position sensors, payload interface, weapon control interface, and the mechanical structure, links, and gripper fingers integrated. The PTZ arm 26 has a motor, motor driver and power conditioning.

In the embodiment herein, the core module 22 has a plurality of serial ports, and can be configured to multiple serial communication protocol standards. Among them, serial ports in the core module are connected to the head module 24, and from there connected to different modules. In the embodiment herein the serial ports from the head module are connected to: the drive transmission and flipper transmission modules 18 and 19, the gripper arm 28, the PTZ arm 26, the fiber optical module 44. In addition other modules or components may also be connected to the serial ports. All the communications are initiated by the core module 22. Only the core module 22 can "talk" to different modules and the modules will not "talk" to each other directly. However, the head module passes the information or "talk" to the other components. The core module routes the communication through the head module 24. It will be appreciated by those skilled in the art that the number of ports in the core module 22 and the head module 24 may vary depending on the specific use and specifications for the mobile robot.

The upgrade module 46 includes fiber optic spool and cable and additional sensors. The upgrade module is only for use in the large and medium mobile robots. The fiber optic cable is connected to the control unit and is to communicate with the core module 22.

Figure 7:
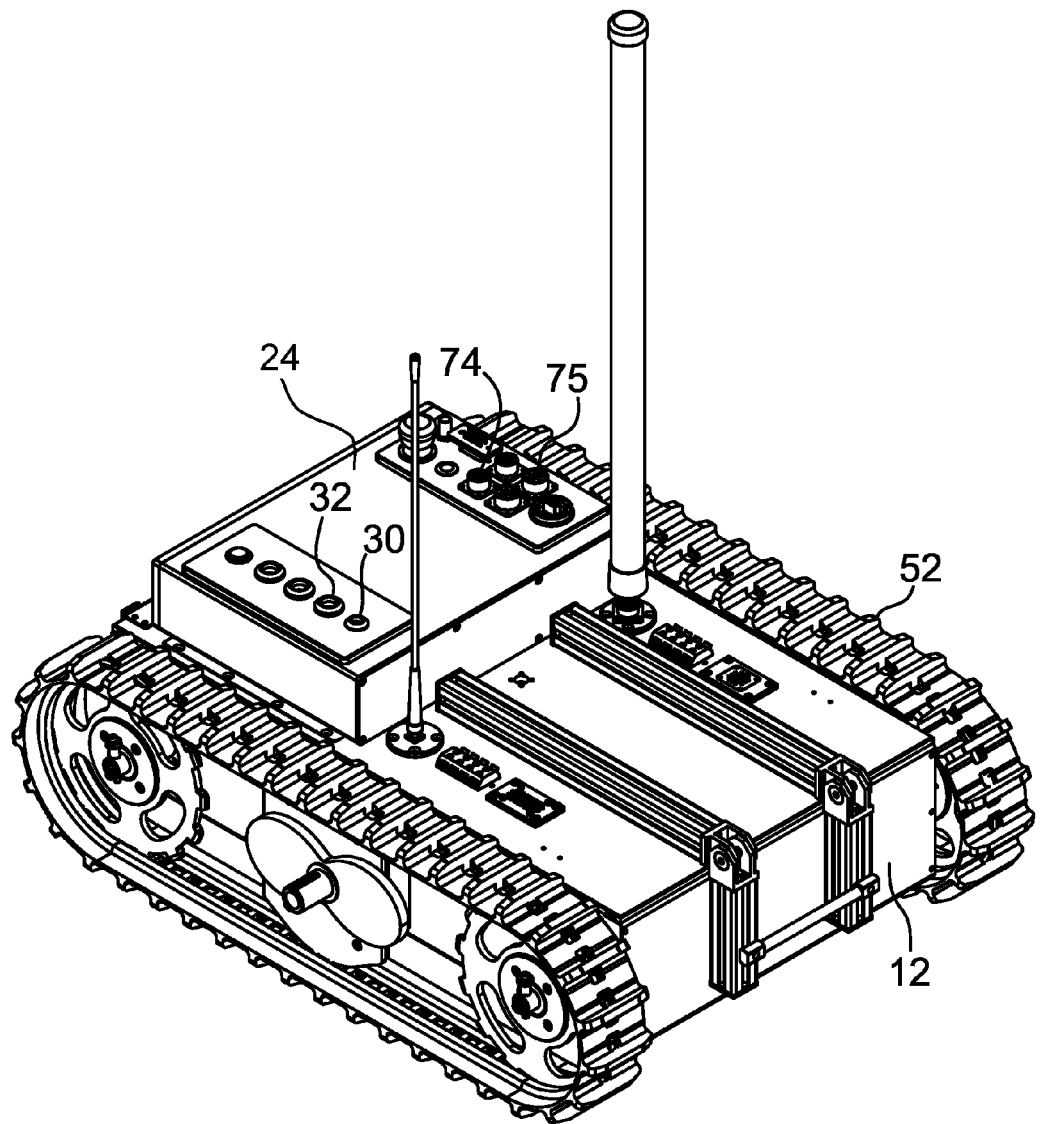
FIG. 7 is a perspective view of the chassis portion of the modular mobile robot but showing it configured with a short track.
Figure 8:
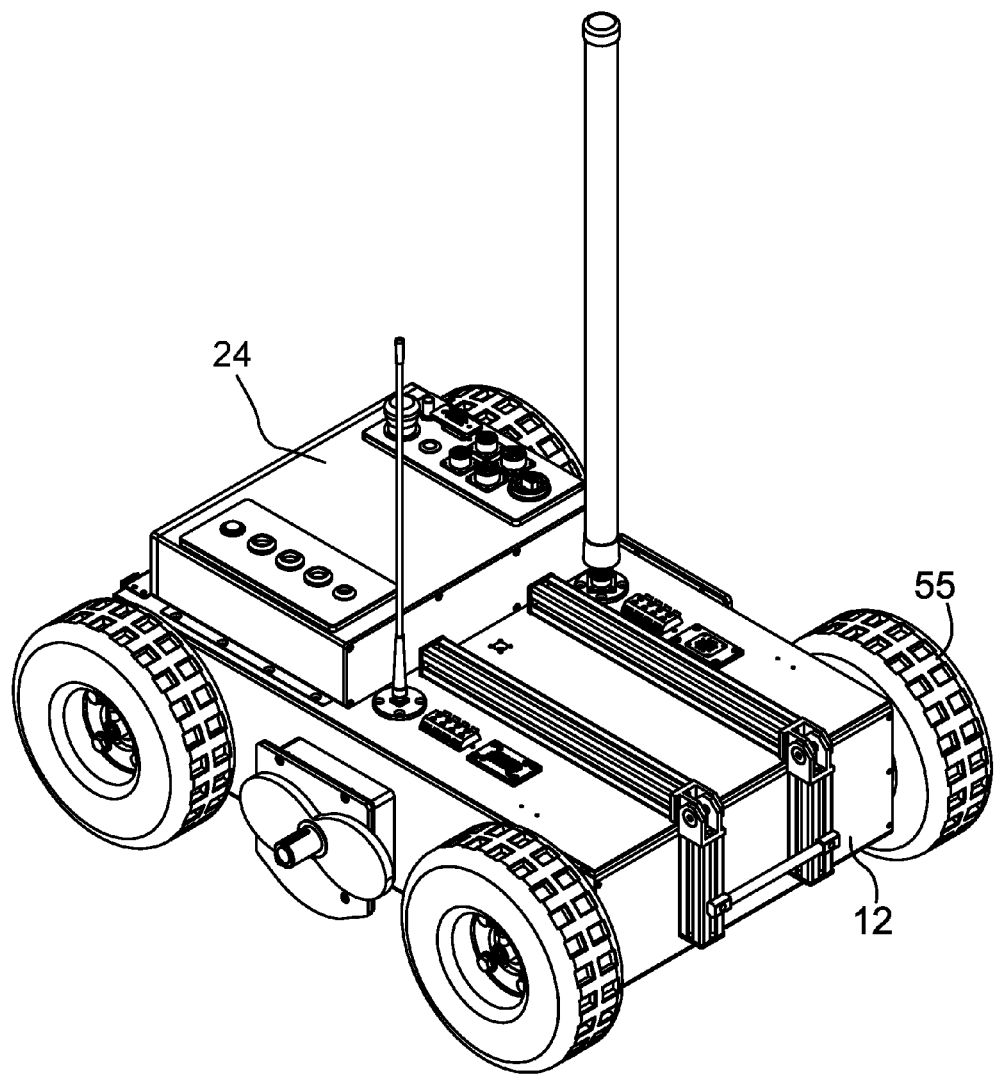
FIG. 8 is a perspective view of the chassis portion of the modular mobile robot similar to that shown in FIG. 7 but showing it configured with wheels.

It will be appreciated by those skilled in the art that embodiment of the modular mobile robot shown and described herein provides the user with a number of options in regard to the configuration of the robot and the components attached thereto. For example the robot has three basic traction configurations; namely the long tack traction module 14 and flipper modules 16 attached to the chassis, as shown in FIGS. 1, 2 and 4 to 6; a short track traction module 52 attached to the chassis as shown in FIG. 7; and wheel traction module 55 attached to the chassis as shown in FIG. 8.

Figure 9:
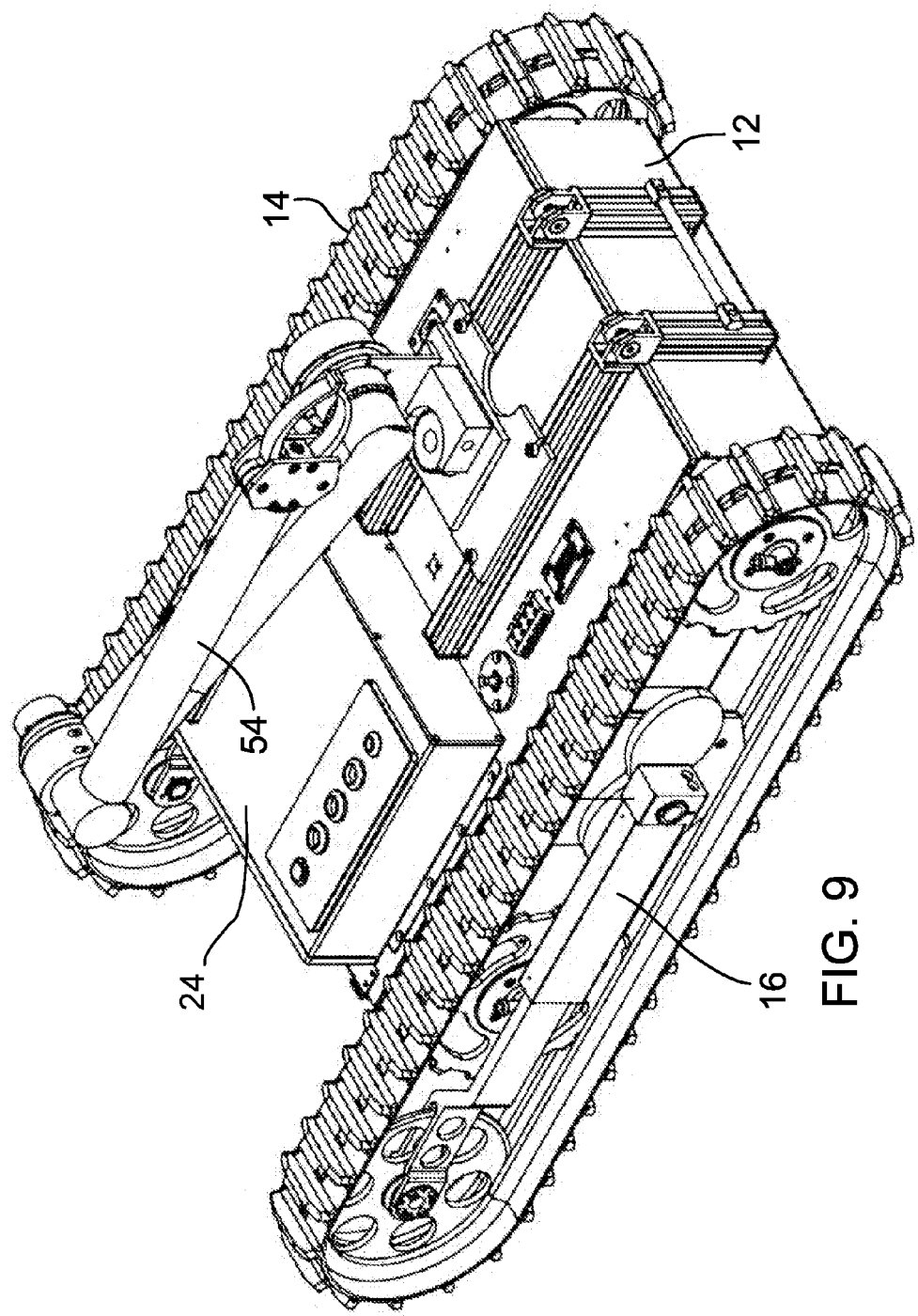
FIG. 9 is a perspective view of a modular mobile robot similar to that shown in FIG. 1 but showing a small arm with a turret.
Figure 10:
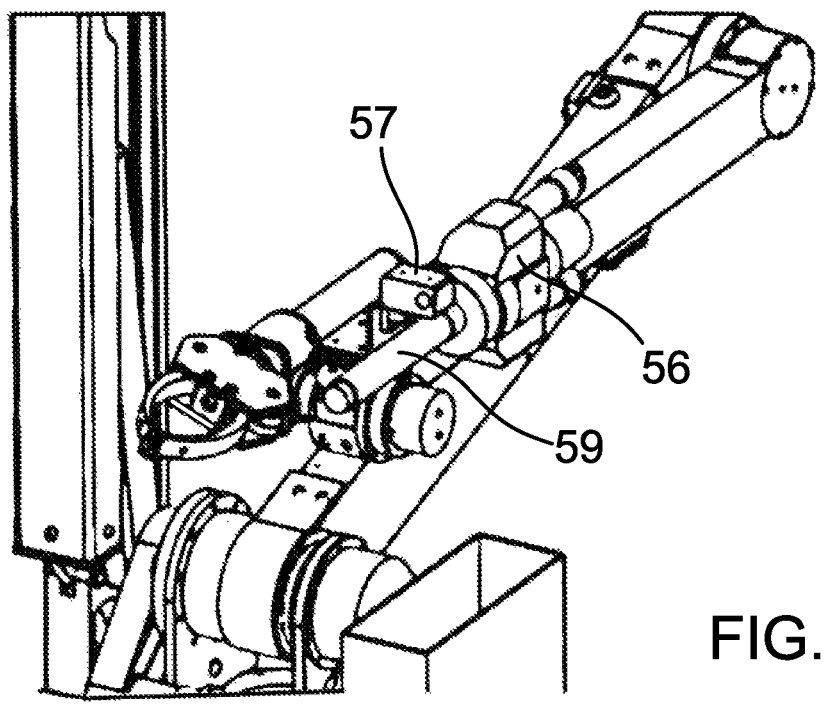
FIG. 10 is an enlarged view of a gripper arm showing a disruptor module attached thereto.
Figure 11:
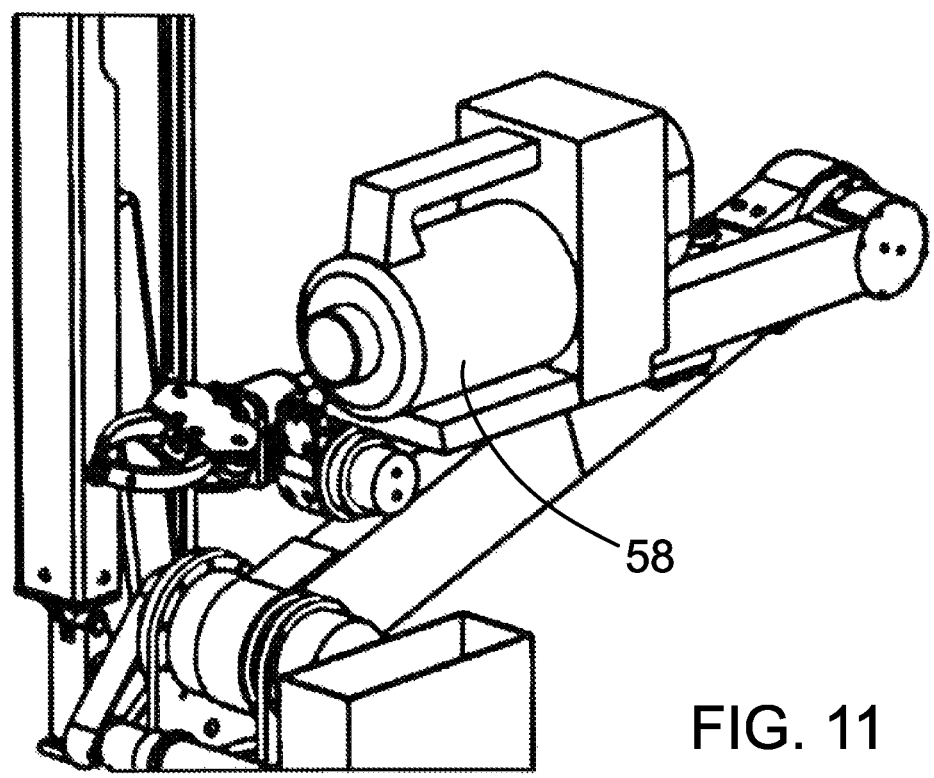
FIG. 11 is an enlarged view of the gripper arm of FIG. 10 showing an X-ray module attached thereto.
Figure 12:
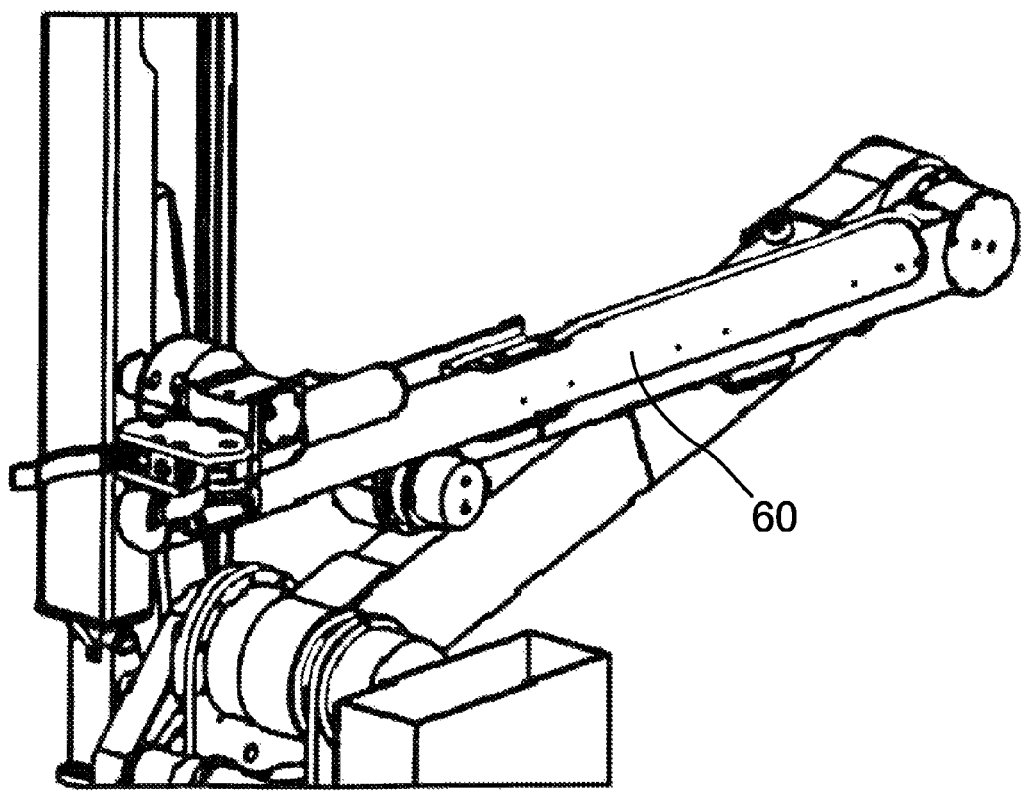
FIG. 12 is an enlarged view of the gripper arm of FIG. 10 showing an extendable link attached thereto.
Figure 13:
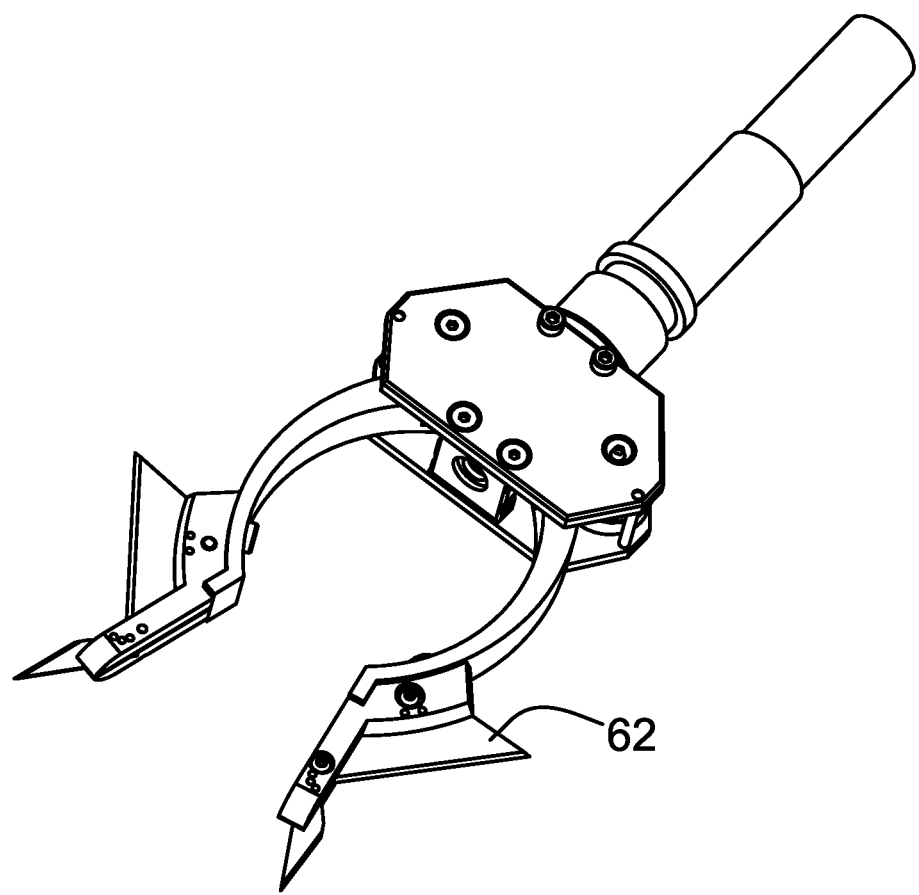
FIG. 13 is an enlarged view of the end of the gripper arm of FIG. 10 showing a cutter on the gripper.

As well the embodiment of the modular mobile robot shown herein allows for the reconfiguring of the arm and payloads for specific missions. For example, referring to FIG. 9, an alternate gripper arm 54 which is smaller than gripper arm 28 may be attached to the rails 38 and operably connected to the same ports as gripper arm 28. Gripper arm 28 or gripper arm 54 may have a variety of different components attached thereto. For example a disruptor 56 or a laser pointer 57 or a weapon 59 all as shown in FIG. 10 or an X-ray 58 as shown in FIG. 11 may be attached to the gripper arm. Alternatively the gripper arm may include an extendable link 60 as shown in FIG. 12. The gripper may include a cutter 62 as shown in FIG. 13.

Figure 14:
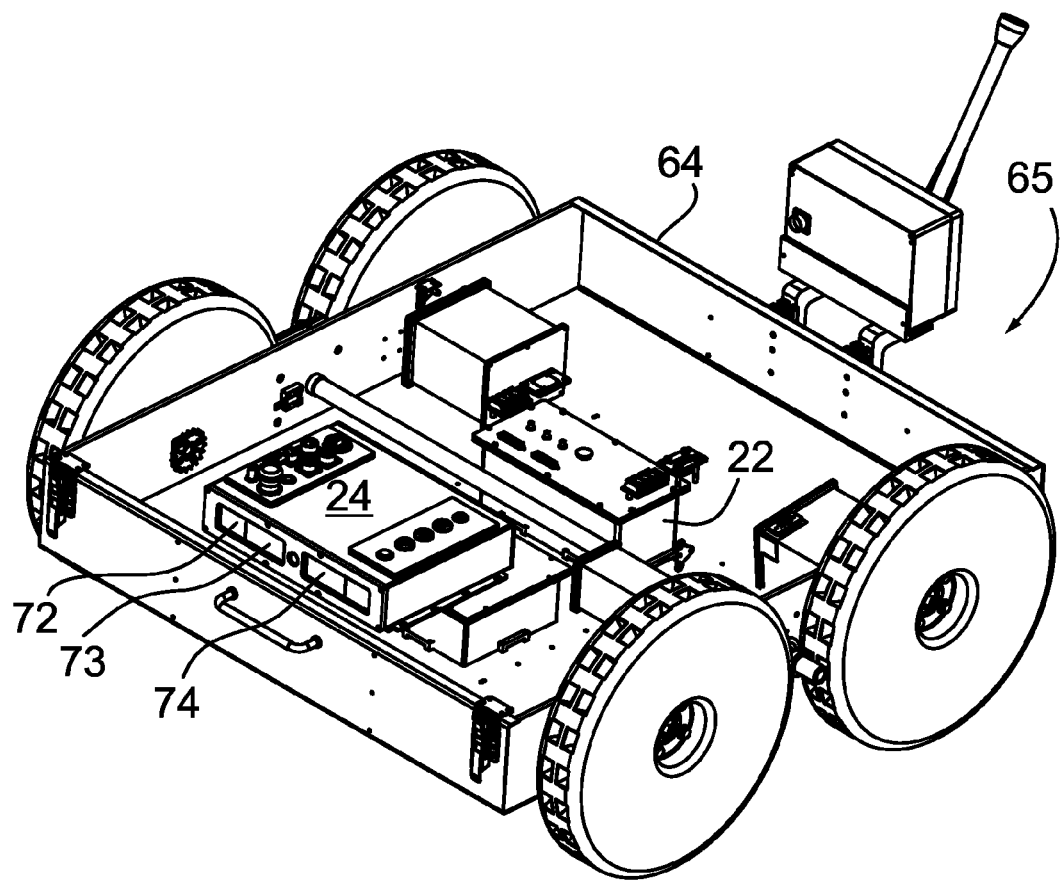
FIG. 14 is a perspective view of the chassis of a modular mobile robot showing the head module and core module of FIGS. 4 and 5 in a larger robot than that shown in FIGS. 4 and 5.

A number of modules may be interchangeable between different sized mobile robots. FIG. 14 shows a chassis 64 of a modular mobile robot 65 which is similar to chassis 12 but larger. Chassis 64 has the head module 24 and the core module 22 positioned therein.

Figure 15:
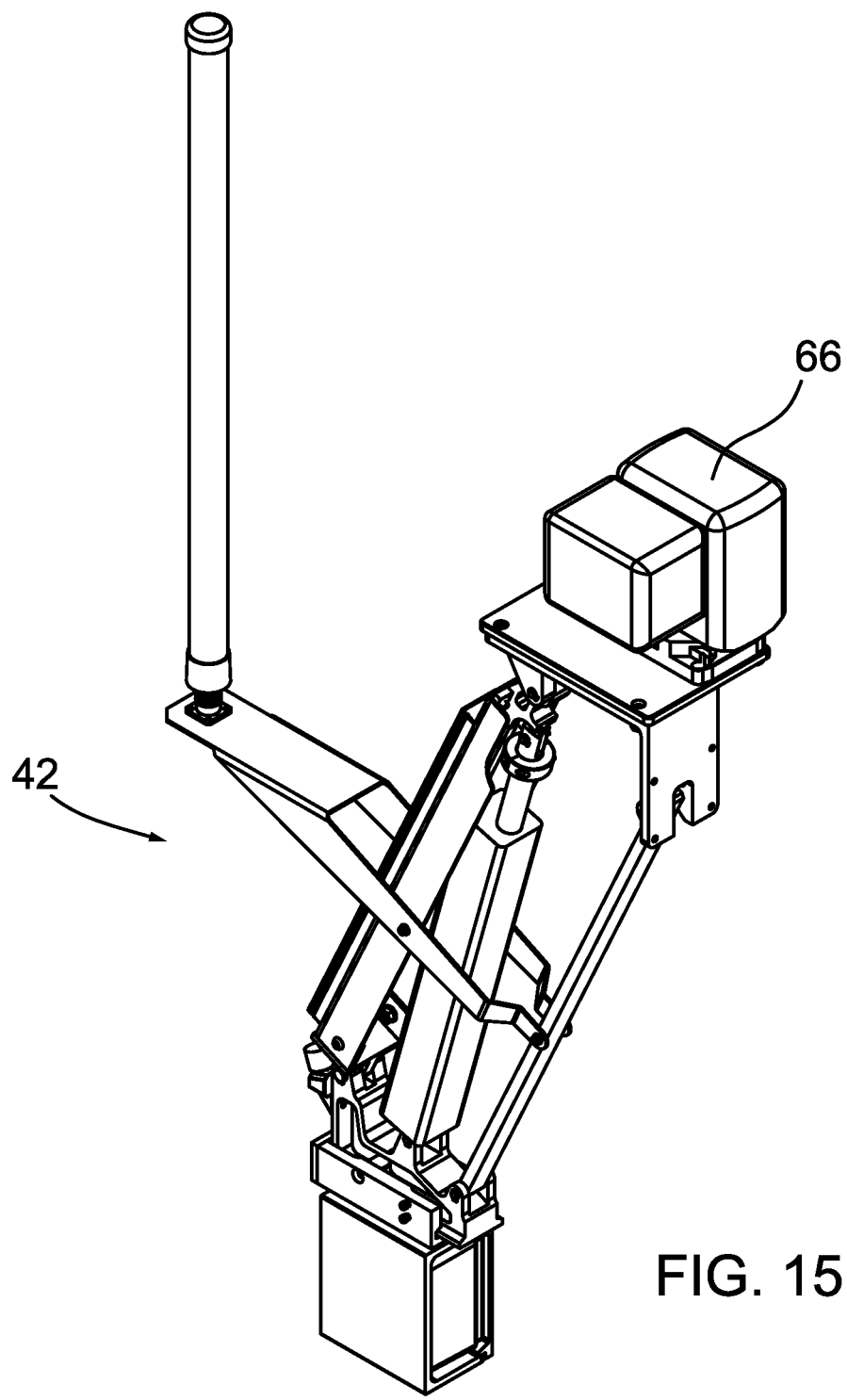
FIG. 15 is a perspective view of a PTZ arm.
Figure 16:
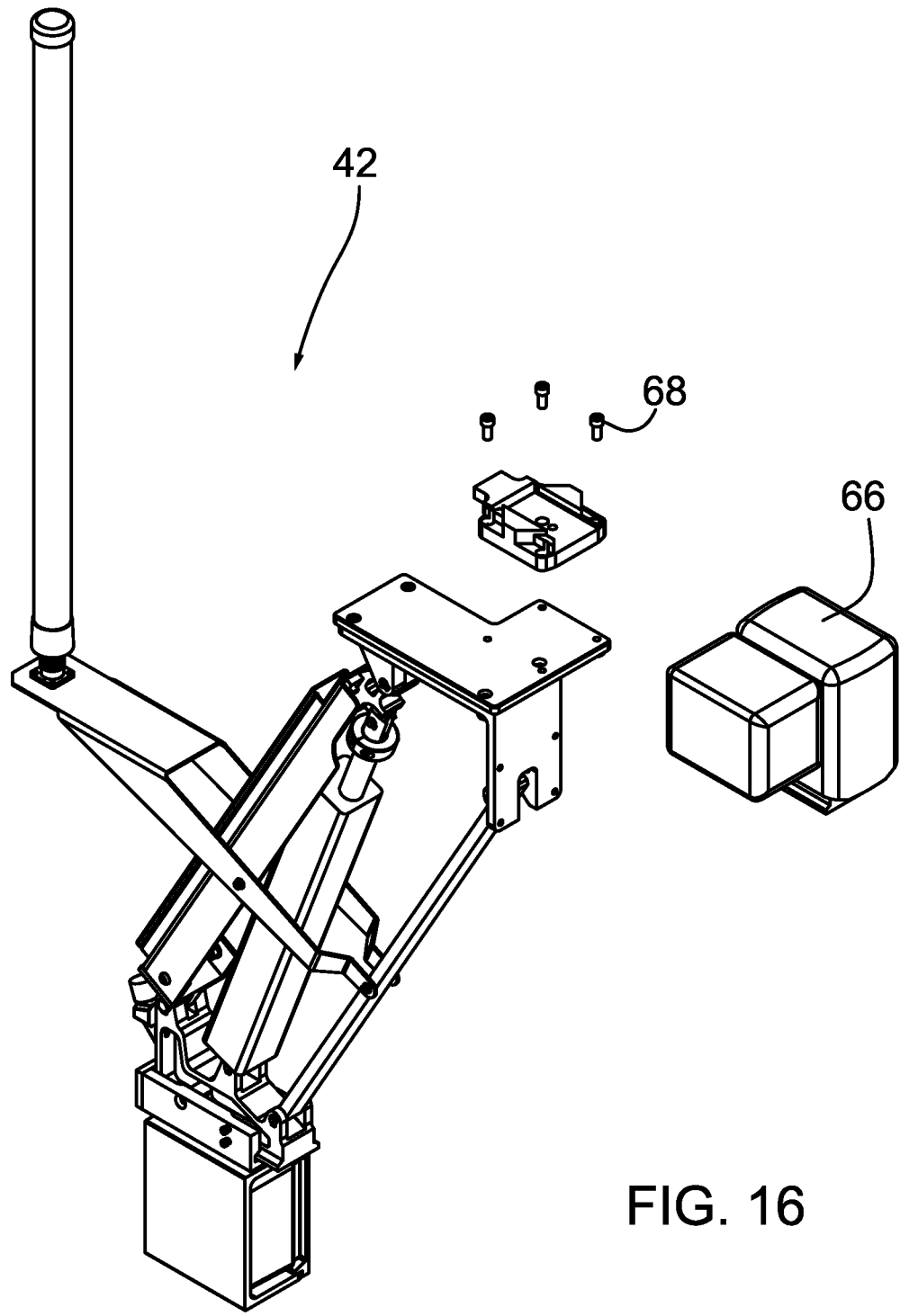
FIG. 16 is a perspective view of the PTZ arm of FIG. 15 but showing the camera module detached therefrom.
Figure 17:
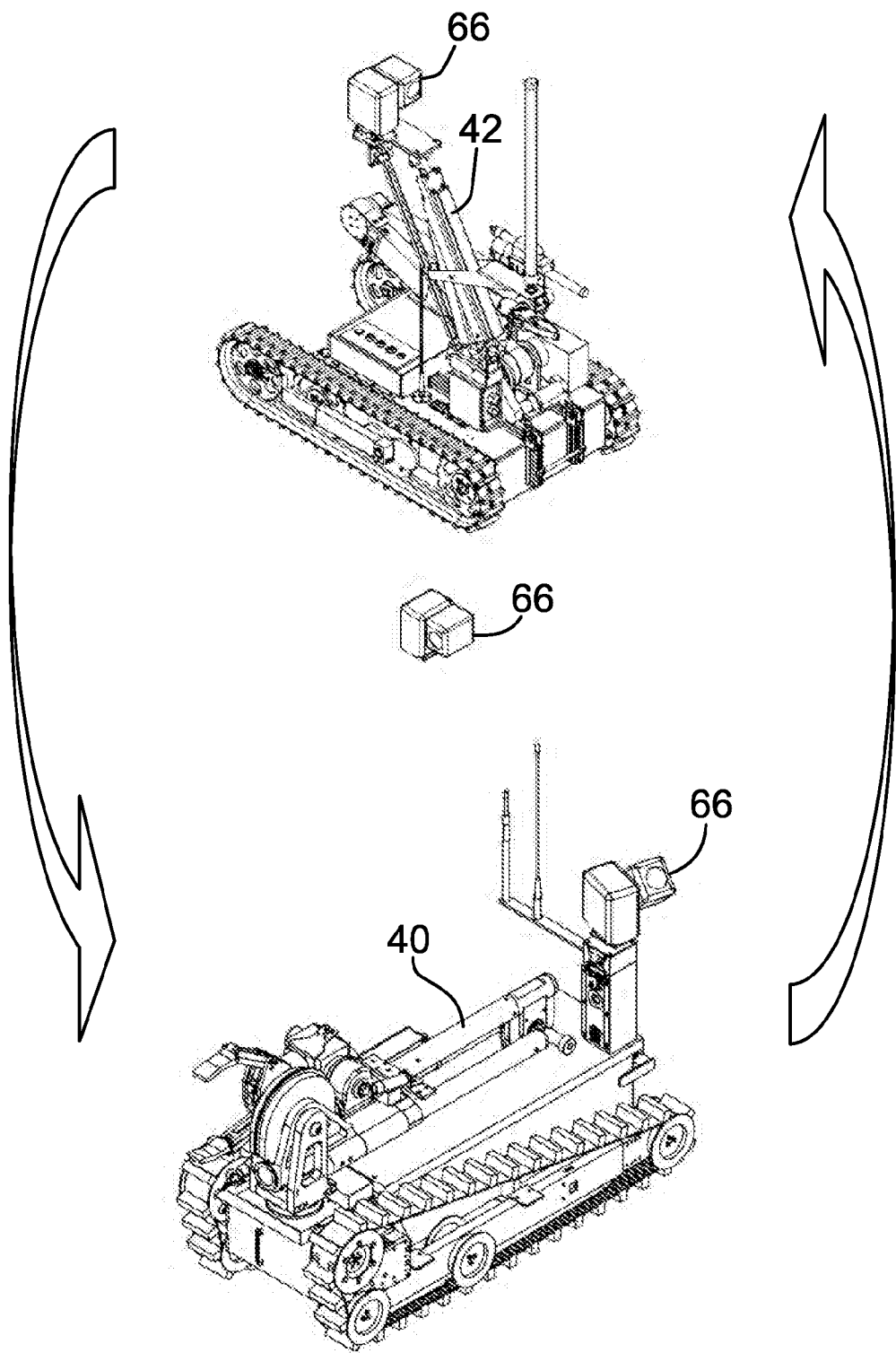
FIG. 17 is showing the camera module that can be transferred to another mobile robot.
Figure 18:
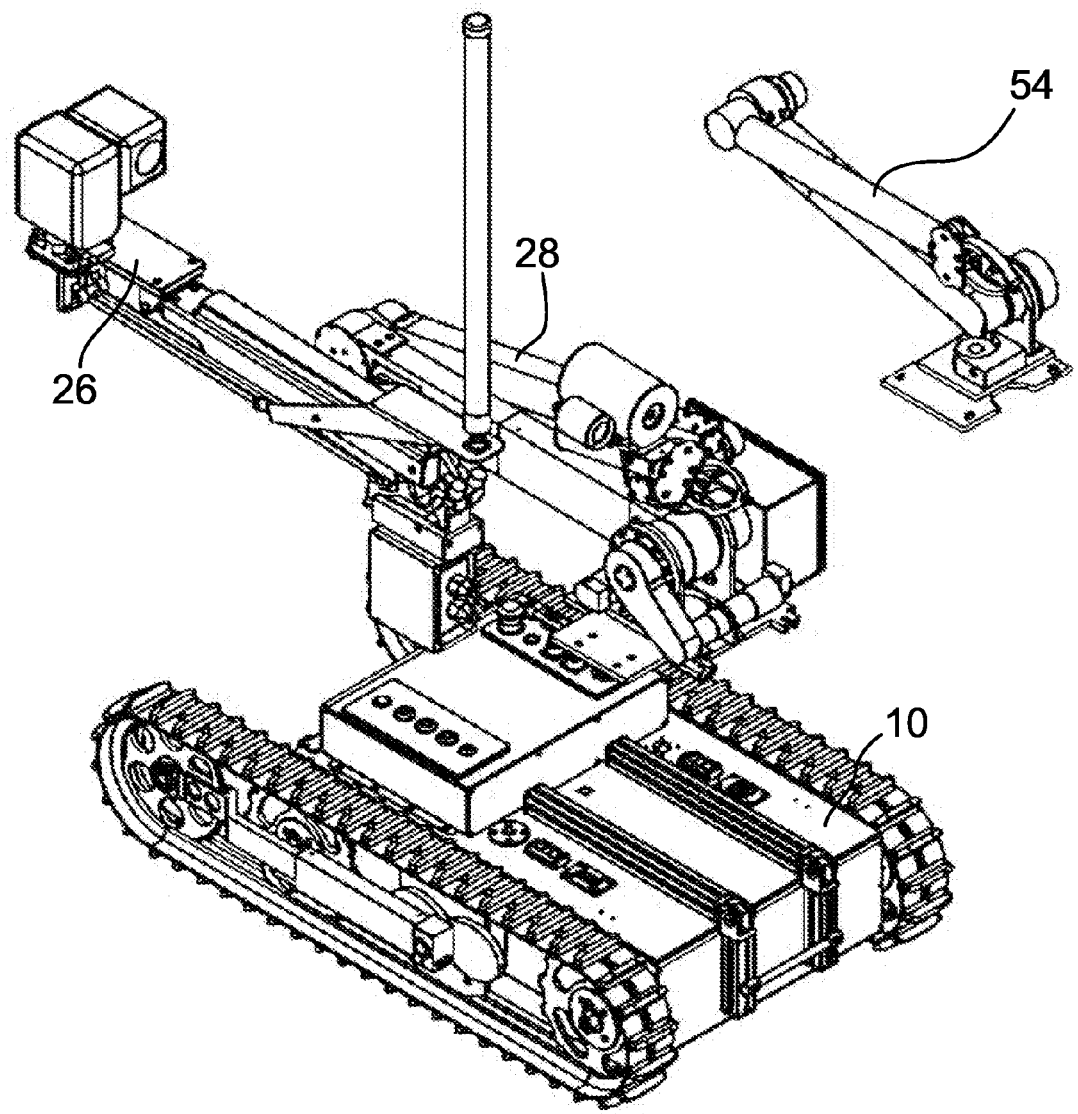
FIG. 18 is a perspective view of a modular mobile robot showing the inter-changeability of large and small arms.
Figure 19:
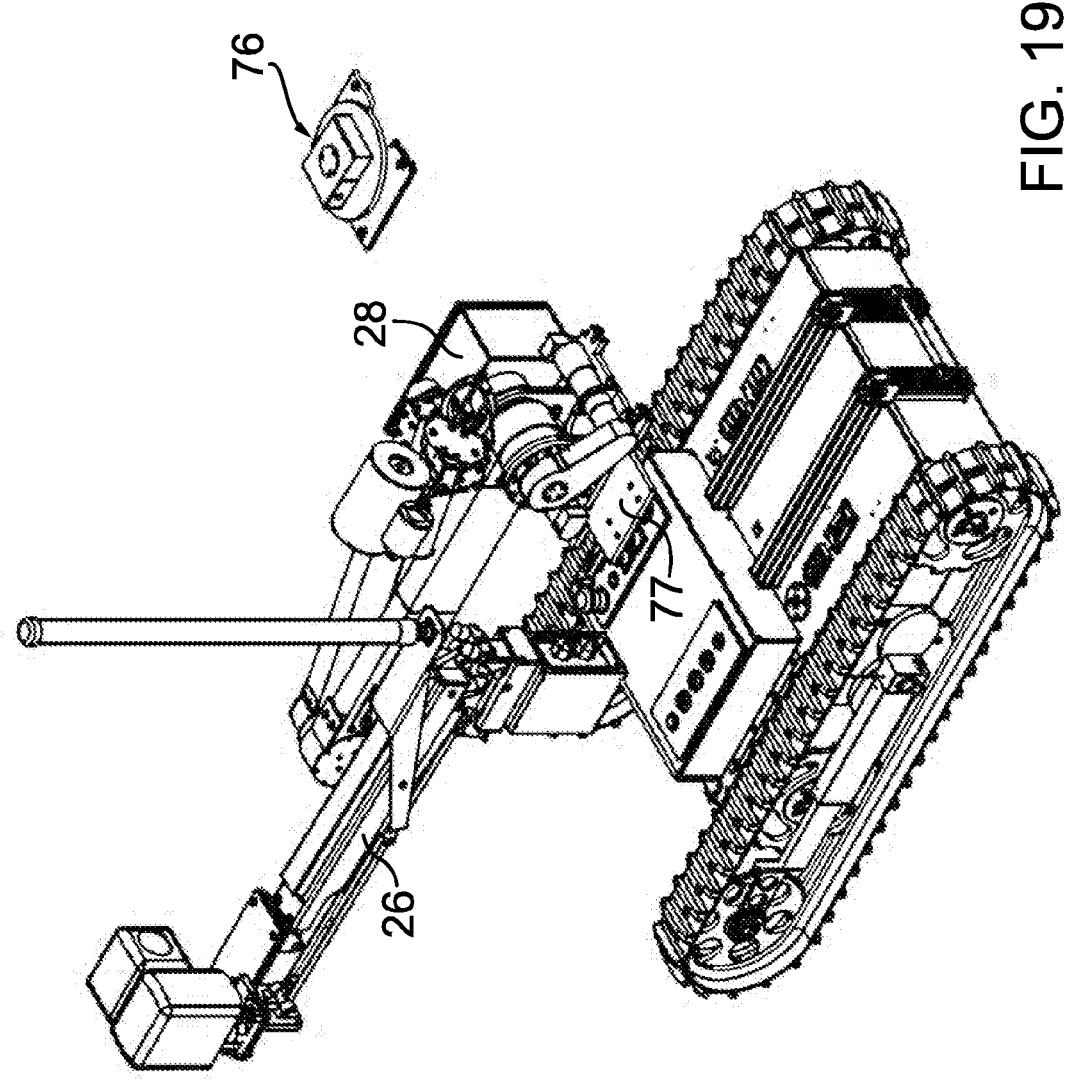
FIG. 19 is a partially blow apart perspective view of a modular mobile robot similar to that shown in FIG. 2 but further including a turret.

Referring to FIGS. 15 and 16, as discussed above a number of modules may be interchangeable between different mobile robots and between mobile robots of different sizes. By way of example the PTZ arm 42 has a camera 66 attached thereto. Camera 66 is attached with a plurality of screws 68 and thus it can be detached by removing the screws. It can then be moved from the PTZ arm 42 to a gripper arm 28 as shown in FIG. 17. FIG. 18 shows an embodiment with (3) three arms that could be attached to the platform 12. The arms are the PTZ arm 26, the large gripper arm 28 and the smaller gripper arm 54. FIG. 19 shows an embodiment that includes a turret 76 wherein the large gripper arm 28 is attachable to the turret 76 and the PTZ arm 26 is attachable to a platform 77 that extends to one side of the large gripper arm 28. The small gripper arm 54 shown herein has a turret incorporated therewith, however, the turret could be a separate module to which a small gripper arm is attached. Any one of the arms 26, 28 and 54 could be attached to turret 76 thereby allowing the arm to rotate 360 degrees.

The embodiments of the modular mobile robot may also include modules that may control specific functions. For example an auto navigation module which is operably connected to the core module can control the motion of the robot. An auto navigation module includes a processor and a plurality of sensors, such as IMU (inertia measurement unit), inclinometer, gyro, and LIDAR (light detection and ranging). This module will calculate the path based on the sensor feedback and send the motion commands to the core module. There may also be a module for automatically controlling specific functions of the gripper arm such as an automatic stow motion or an automatic deploy function, as well as automatically grasping and changing tools from the tool box. This auto grasping module includes a processor and a plurality of sensors such as force and tactile sensors.

Figure 20:
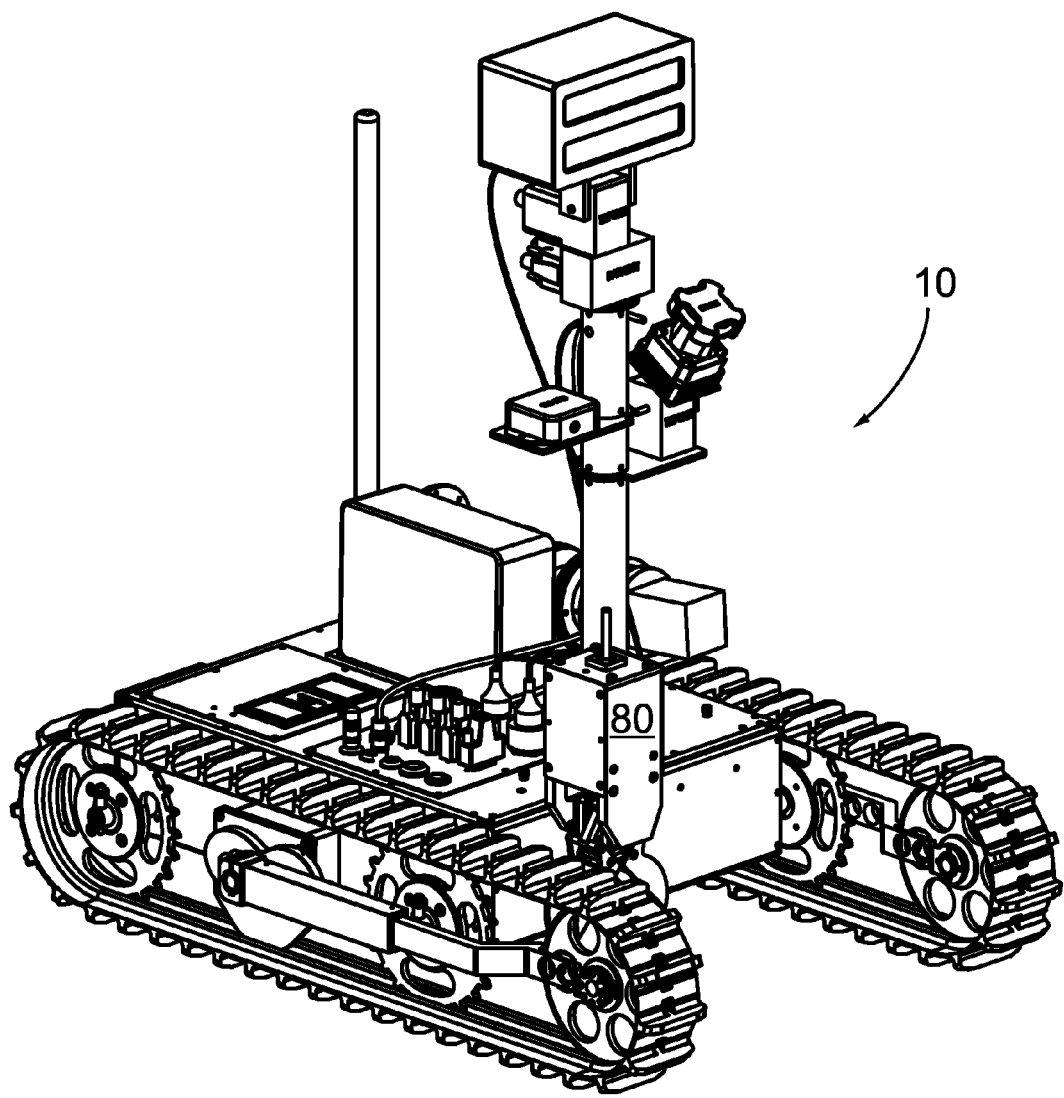
FIG. 20 is a perspective view of a mobile robot in the long track mode with a tooling arm attached to the chassis.
Figure 21:
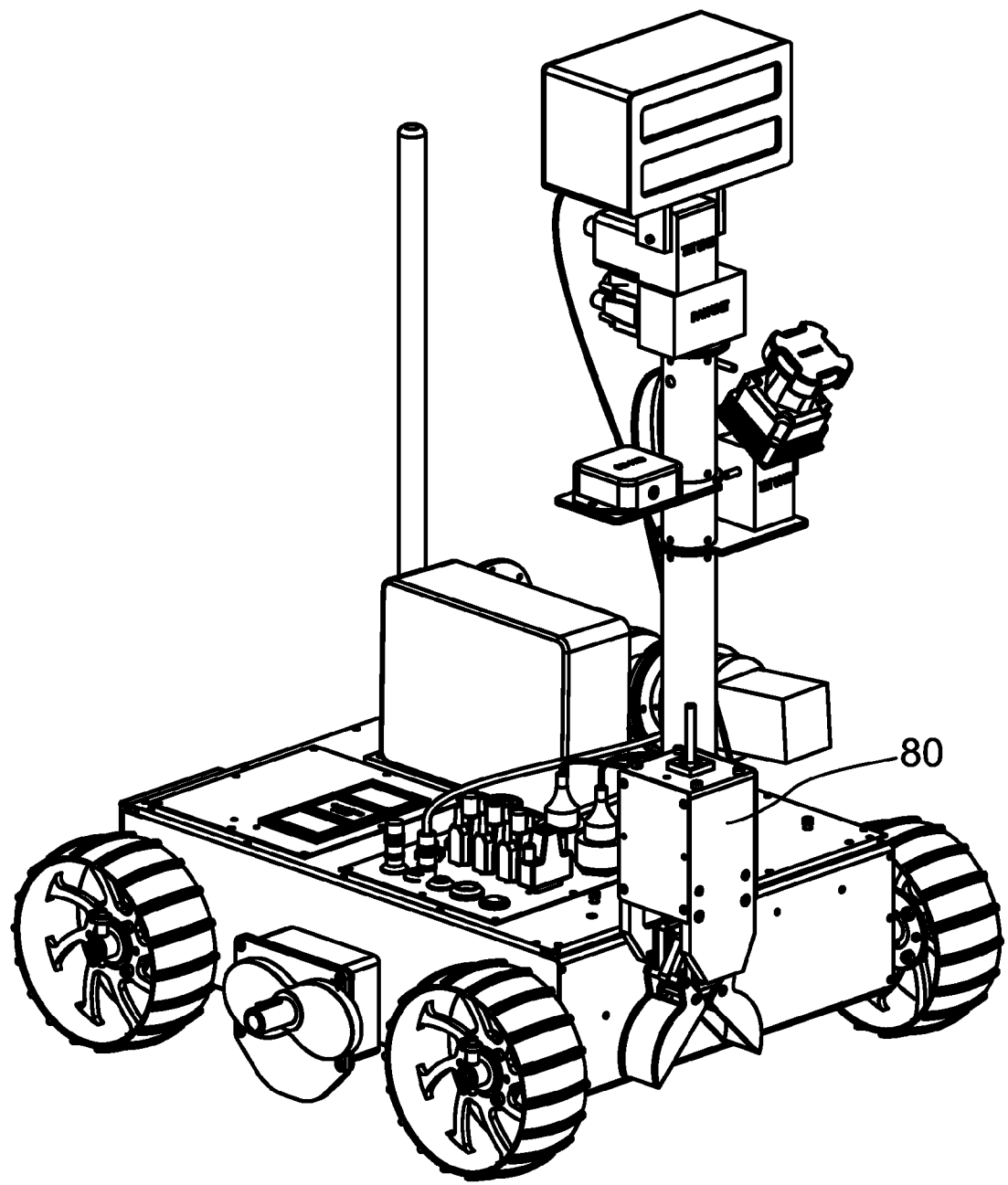
FIG. 21 is a perspective view similar to that shown in FIG. 20 but shown the mobile robot in wheels mode.

Referring to FIGS. 20 and 21, a tooling arm 80 is shown attached to a mobile robot 10. It will be appreciated that this tooling arm 80 may be attached to mobile robot 10 when it is a number of different configurations. By way of example, as shown in FIG. 20 it can be attached to a mobile robot in the long track mode or as shown in FIG. 21 in the wheel mode. The tooling arm 80 is particularly useful wherein the robot is a micro-robot and weight is an important. The tooling arm 80 is particularly useful for scooping and collecting small samples. The tooling arm 80 enables sampling and digging to a predetermined depth and to capture and stow a sand or soil sample. Thus the tooling arm is particularly useful for robots that are used in lunar or Martian explorations.

Figure 22:
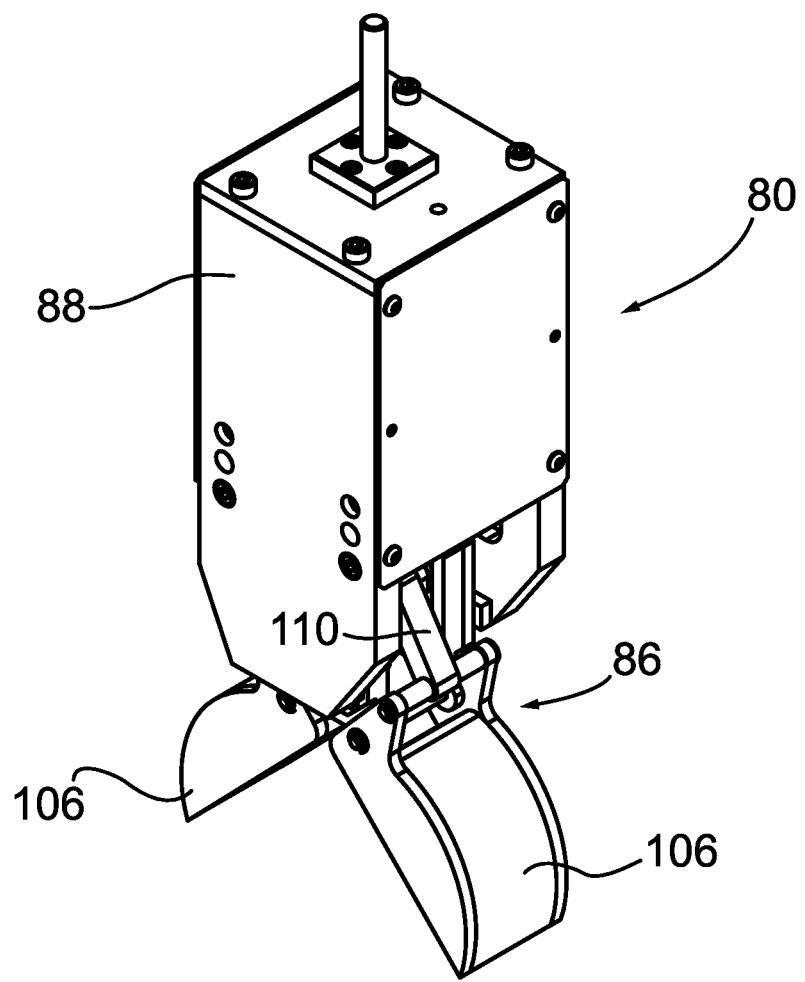
FIG. 22 is a perspective view of the tooling arm.
Figure 23:
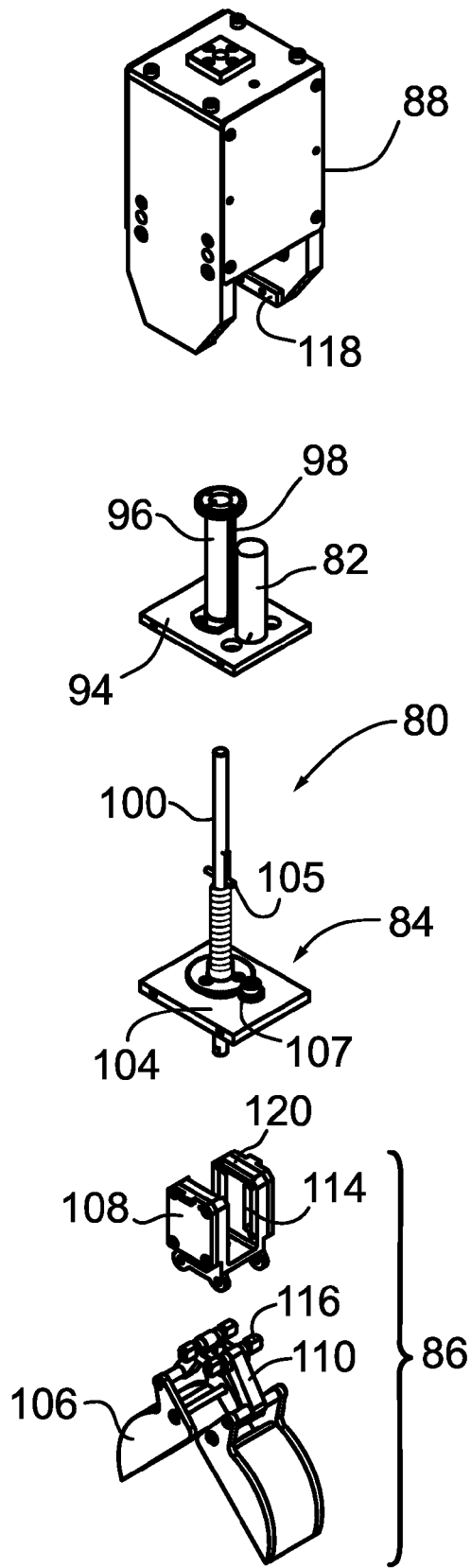
FIG. 23 is a blown apart perspective view of the tooling arm of FIG. 22.
Figure 24:
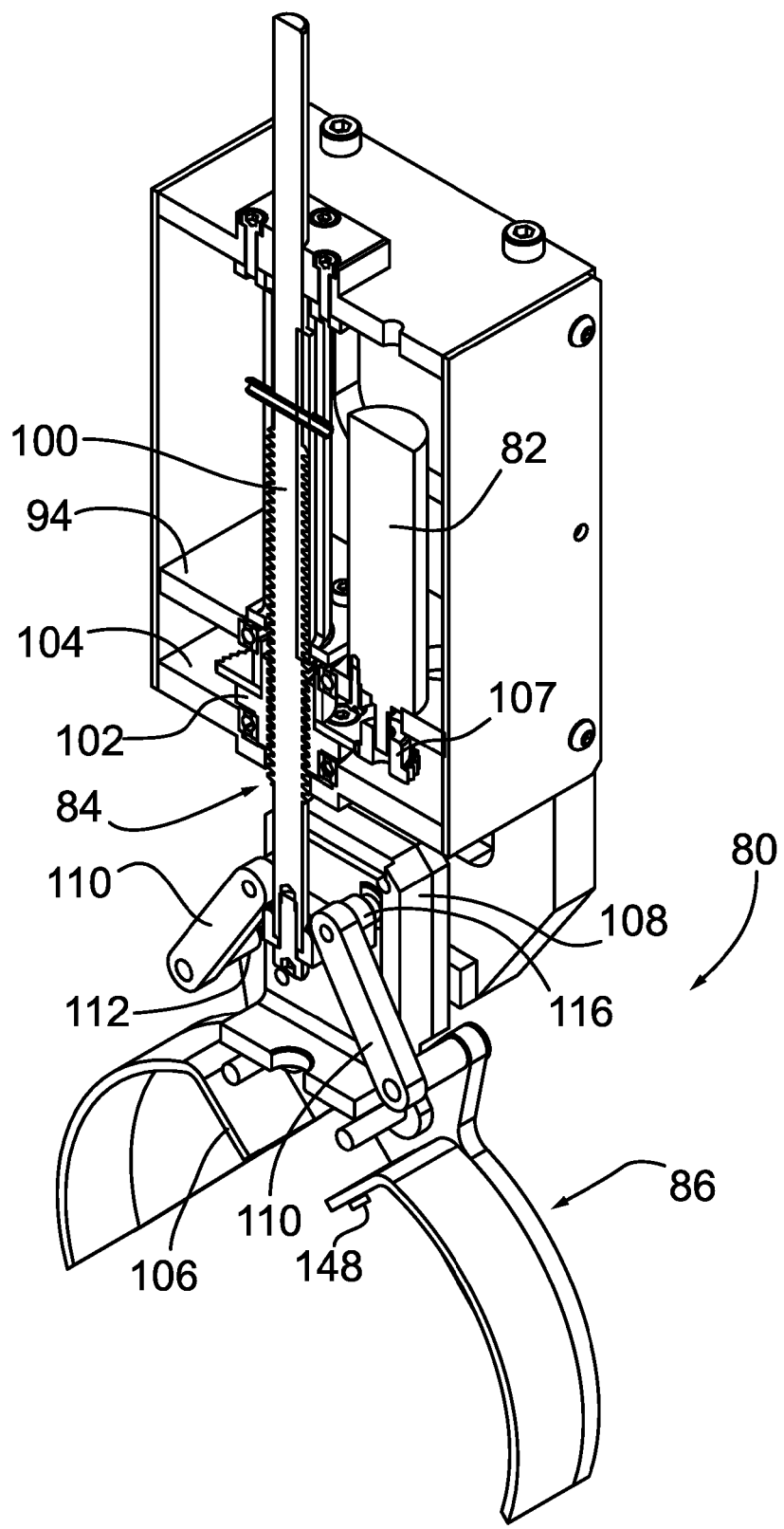
FIG. 24 is a sectional perspective view of the tooling arm of FIG. 22.
Figure 25:
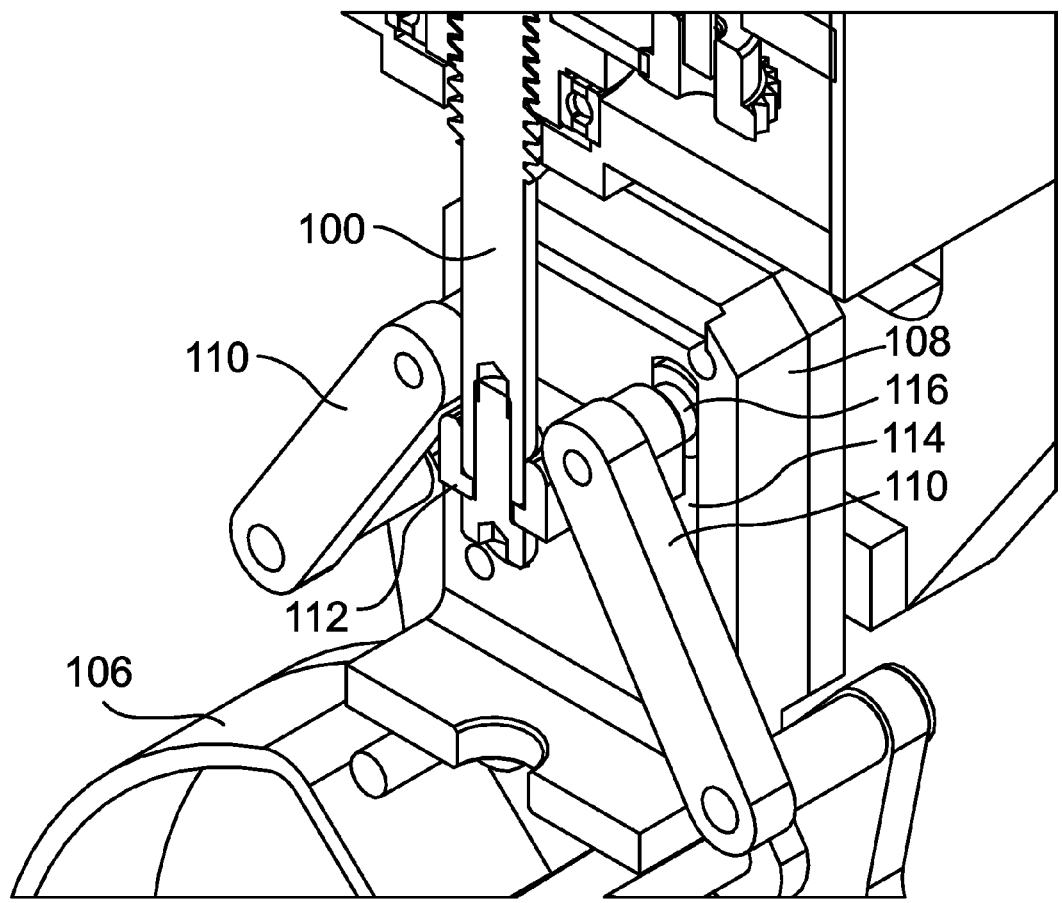
FIG. 25 is an enlarged perspective view of the link mechanism of the tooling arm of FIG. 22.

Referring to FIGS. 22 to 24, the tooling arm 80 includes a drive system 82, a lead screw and nut assembly 84, a scooping assembly 86 and a housing 88. The tooling arm 80 may be fixedly mounted in the front of the mobile robot 10 as shown in FIGS. 19 and 20. Alternatively the tooling arm 80 may be releasably attachable to rails 38 (shown in FIGS. 1 to 19).

Figure 26:
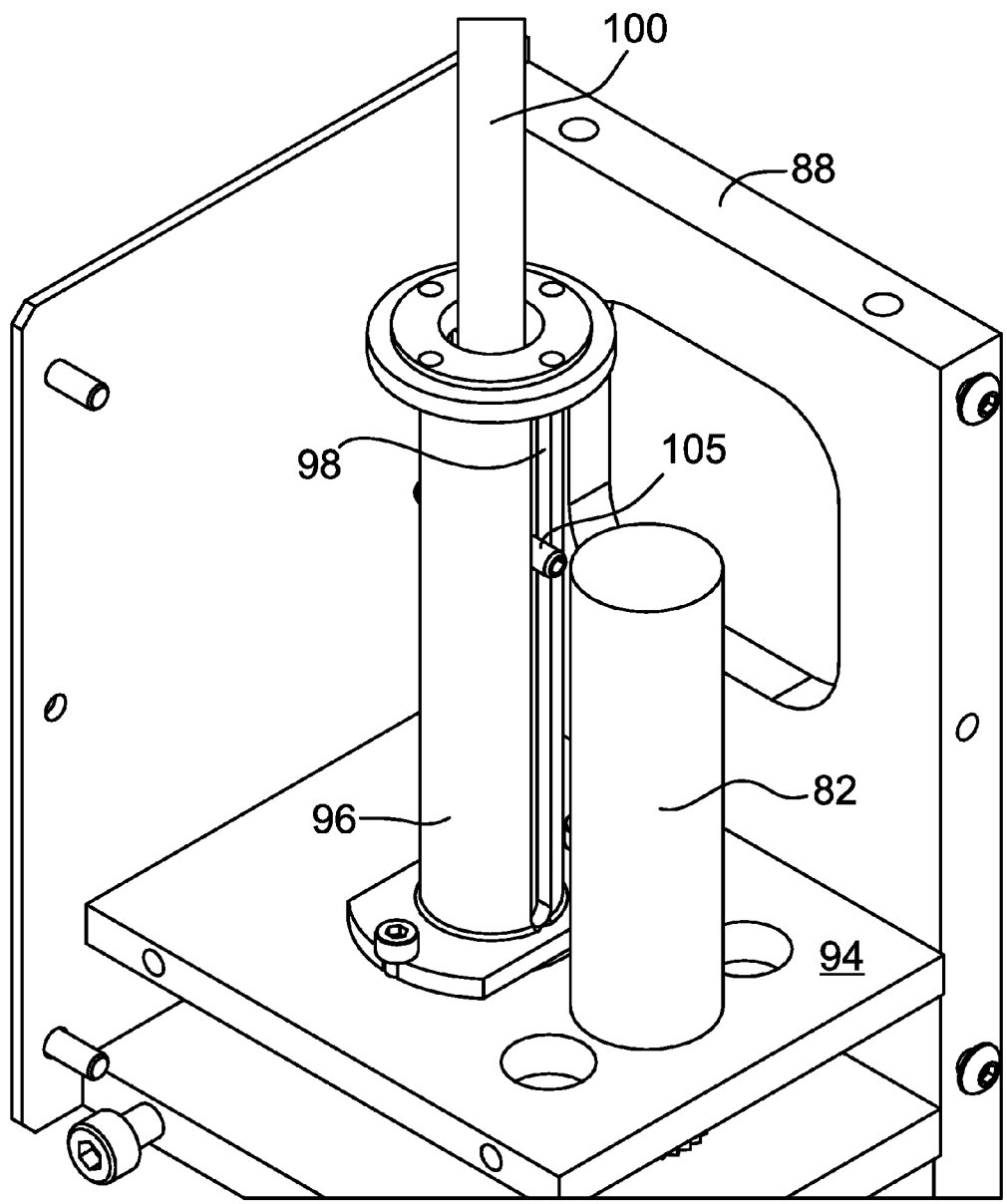
FIG. 26 is an enlarged perspective view of the lead screw and motor of the tooling arm of FIG. 22.

Drive system 82 may be a motor and gear head assembly. The drive system 82 is fixedly mounted on an upper mounting plate 94 which is fixedly attached to the housing 88. Lead screw and nut assembly 84 includes a lead screw 100, a nut 102 (as best seen on FIG. 24), a guide tube 96 with a vertical slot 98 therein (as best seen in FIG. 26), and a lower mounting plate 104 which is fixedly attached to the housing 88. Nut 102 is rotatably attached to lead screw 100. A screw pin 105 extends through the lead screw 100. Screw pin 105 extends through lead screw 106 and its motion is limited within the slot 98 of guide tube 96. Guide tube 96 is fixedly mounted on upper mounting plate 94. Drive system 82 is operably connected to nut 102 by a pair of meshing spur gears 107 (best seen in FIG. 23). Meshing spur gears 107 are fixedly connected to nut 102 and the drive system 82, respectively. Thereby, the lead screw 100 moves upwardly and downwardly in a generally vertical fashion relative to housing 88 and the chassis of the mobile robot.

The scoop assembly 86 includes a pair of scoops 106, a pair of links 110 and a shuttle 108. Each scoop 106 is pivotally attached to a shuttle 108. Each link 110 is pivotally attached at one end thereof to a scoop 106 and at the other end thereof to a bracket 112. Bracket 112 is attached to the bottom end of the lead screw 100. Thus as the lead screw moves up and down the bracket 112 moved up and down. Shuttle 108 has a pair of generally vertical slots 114 formed therein. A post 116 extends outwardly from the link 110 where the link is pivotally attached to the bracket 112. Post 116 slidingly engages the slot 114 in shuttle 108. The scooping assembly 86 acts as a four bar link mechanism wherein the slider is the lead screw 100; the coupler link is link 110; the slide link is the scoop 106; and the frame is the shuttle 108.

Figure 29:
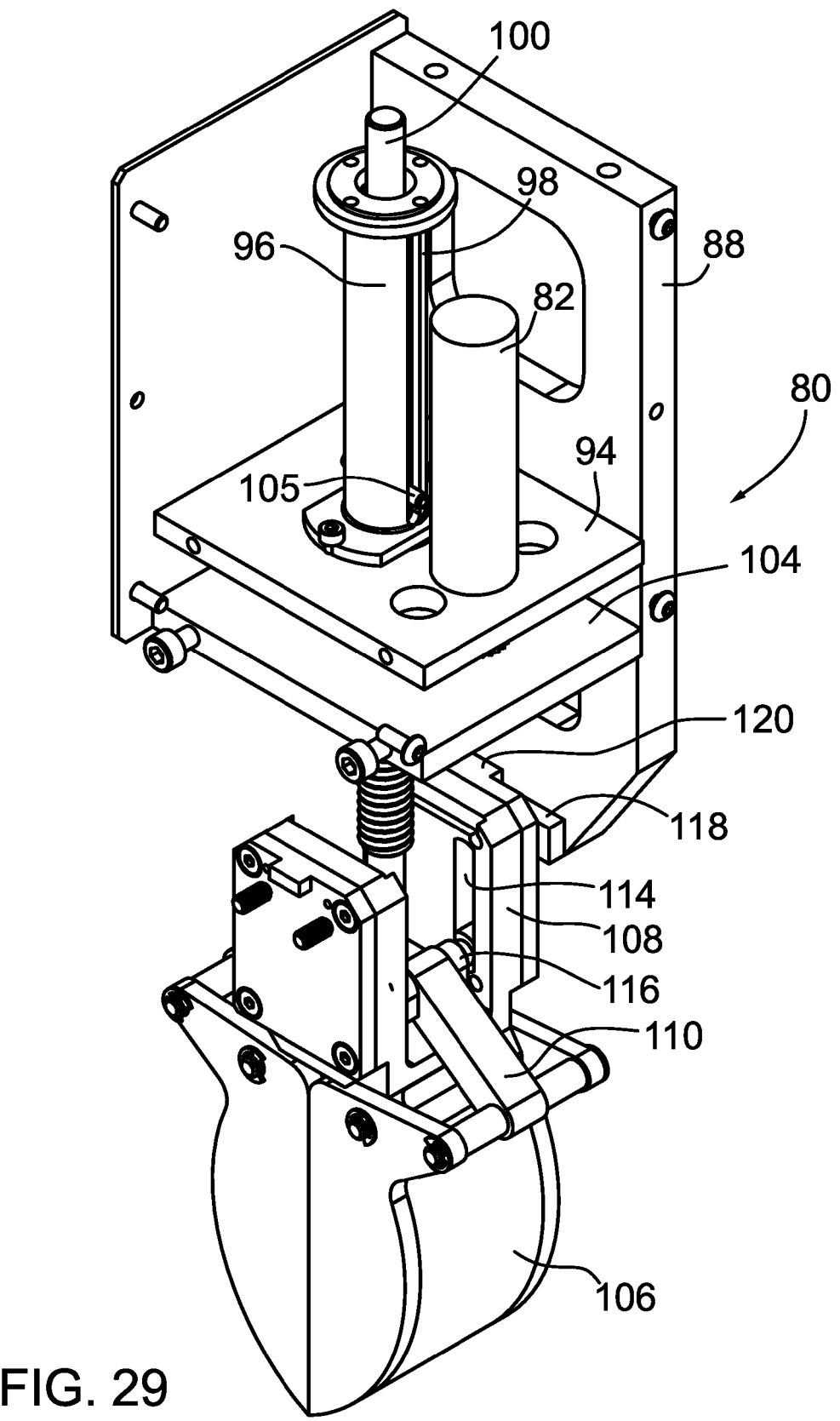
FIG. 29 is a perspective view similar to that shown in FIG. 27 but showing the scoops closed.

Housing 88 is provided with a block 118 which is adapted to engage stopper 120 extending outwardly from shuttle 108 as best seen in FIGS. 23 and 29.

Figure 27:
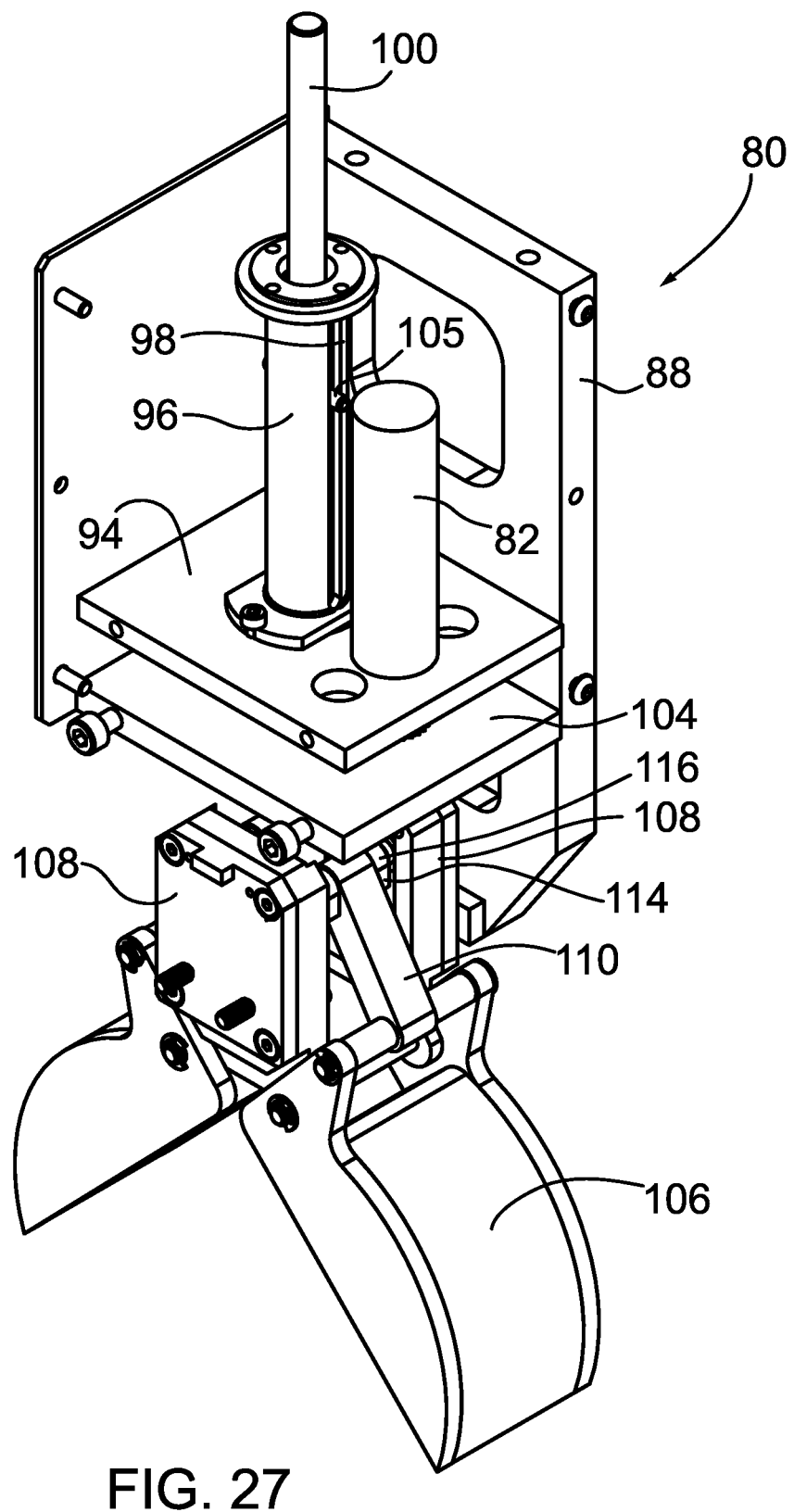
FIG. 27 is a perspective view of the tooling arm of FIG. 22 but with a portion of the housing removed and showing the tooling arm at the start or open position.
Figure 28:
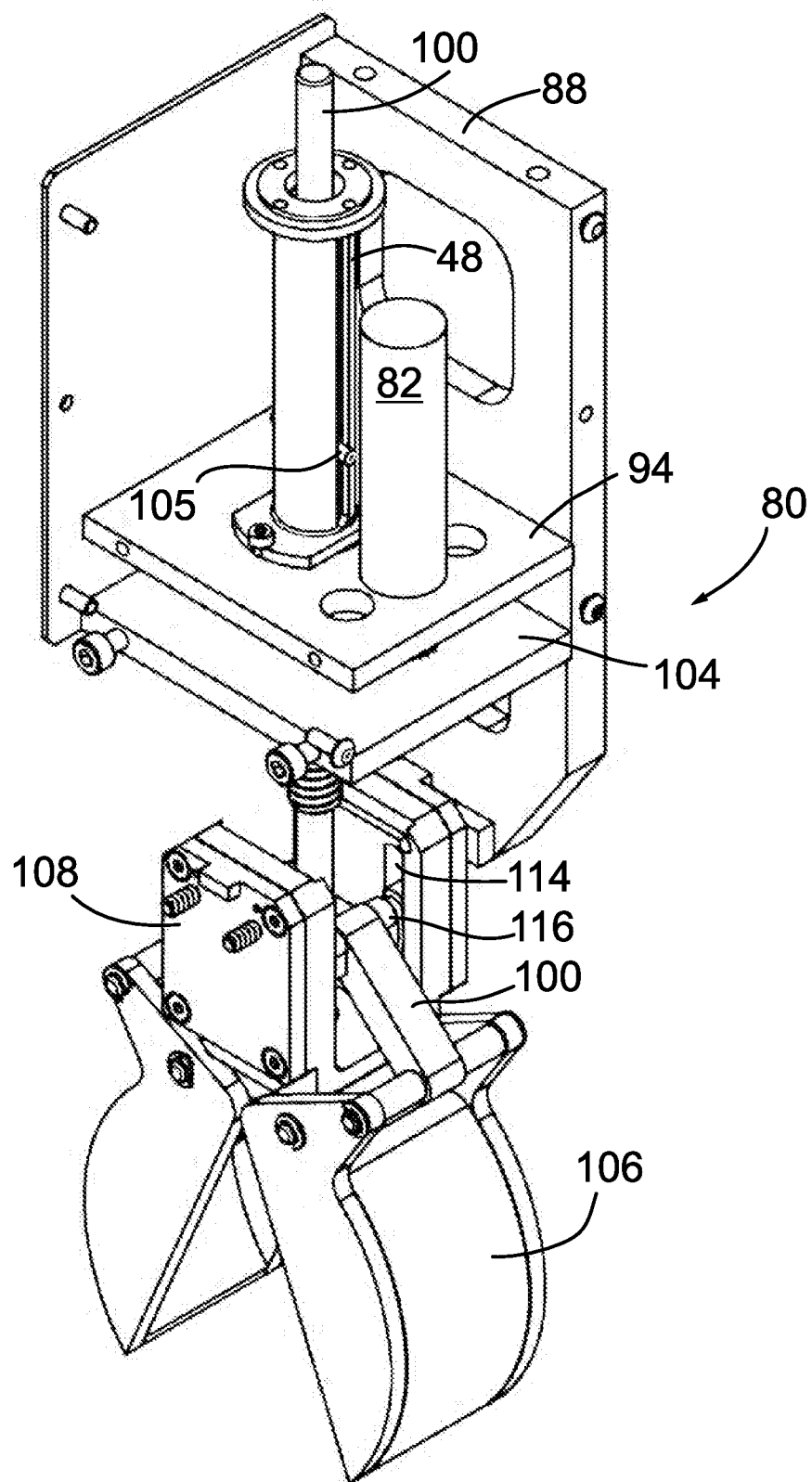
FIG. 28 is a perspective view similar to that shown in FIG. 27 but showing the scoops partially closed.

FIGS. 27 to 29 show the tooling arm 80 in use. The scoop assembly 86 has an open position as shown in FIG. 27 and a closed position as shown in FIG. 29. The scoop assembly 86 moves from the open position to the closed position responsive to the movement of the lead screw 100 whereby as the lead screw 100 moves downwardly the scoop assembly 86 moves from the open position to the closed position. The scooping assembly 86 is controlled for opening and closing using the downward force of the lead screw 100 acting on links 110. The lead screw 100 moves generally vertically relative to the chassis and does not rotate. Tooling arm 80 has two degrees of freedom (DOF). More specifically tooling arm 80 uses one drive system 82 to realize two motions such that lead screw 100 provides linear motion which is translated into rotational motion by scoops 106 rotation such that they close and open. Lead screw 100 moves upwardly or downwardly depending on the direction of rotation of the motor 90. When lead screw 100 moves downwardly the scoop assembly 83 moves downwardly with the shuttles 108, links 110 and scoops 106 moving downwardly together as a unit. The motion of the shuttle 108 will stop when the shuttle's stopper 120 is obstructed by or engages a block 118 mounted on the housing 88. When the shuttle stopper 120 engages the block 118 the shuttle stops moving downwardly with the downward motion of the lead screw 100. Motor 90 continues to drive lead screw 100 downwardly which in turn causes links 100 to move downwardly in slots 114 of shuttle 108. This in turn causes scoops 106 to dig in and close and scoop up anything in their path. Once the scoop is fully closed, the drive system 82 reverses to drive lead screw 100 upwardly, which in turn lifts the shuttle 108 and scoops 106 upwardly and thus closes scoops 106. The motor 90 is stopped when the scoops 106 are clear of the surrounding sample. To open the scoops and deposit the sample the motor 90 reverses to drive the lead screw 100 upwardly which causes the shuttle 108 to move upwardly until contacting the lower mounting plate 104. The motor 90 continues to drive the lead screw 100 upwardly which in turn cause the links 100 to move upwardly in slots 114 of shuttle 108. This in turn causes the scoops 106 to open and release the sample inside.

A sampling sensor 148 may be mounted inside scoop 106 to measure if sample is collected. A distance sensor may be fixedly mounted on the shuttle 108 to detect the distance between scoop 106 and the ground.

Referring to FIGS. 1, 30 to 34, an endless track is provided, comprising a belt 131 having an inner and outer surface 132, 134, and a plurality of cleats 136 attached to the outer surface 134. The attached cleats 136 generally project outwardly from the belt 131 and provide much of the traction and gripping capabilities of the endless track.

In some embodiments, the cleats 136 are attached to the outer surface 134 defining an attachment area, and a contact surface 138 which has a smaller surface area than the attachment area. In other words, the cleats 136 may be chamfered such that when the track is laid on a flat solid surface, each chamfered cleat 136 contacts the flat solid surface with less area than the attachment area. This reduces the friction and vibration of the track during turning and driving. In order to maintain the traction provided by using an endless track, while still reducing friction and vibration by using chamfered cleats 136, the cleats 136 may be chamfered or rounded only on edges which are substantially parallel to the longitudinal direction of motion of the track 130. For example, for cleats 136 are substantially rectangular prism-shaped before chamfering during manufacturing, each of the plurality of chamfered cleats 136 remains substantially rectangular when viewed in a lateral direction to the track. For example, as shown in FIG. 36, cleats 136 viewed along section A-A appear to have a trapezoidal top, where the top corners in this view (which are edges in 3 dimensions, parallel to the longitudinal direction of track motion) have been chamfered to reduce the surface area of the contact surface 138. However, when viewed in a lateral direction, such as shown in FIG. 35, the cleats 136 appear substantially rectangular. The cleats 136 may further have fillets 140 or other reinforcement at the connection between them and the outer surface 134 of the endless track, as shown in FIGS. 31, 34 and 38. The cleats 136 may be made of any material known to be suitable for the application by those skilled in the art; for example, rubber or polyurethane. In embodiments where the cleats 136 are made of rubber, the cleats may have a rubber coating. The rubber may be soft for reducing vibration and flexible for bending. The properties of the cover rubber may be as follows: hardness—80 shore A, tensile strength—13800 psi, elongation—1380%. Further, it will be appreciated that the cleats 136 may be integrally formed with the belt.

In some embodiments of the endless track, a dual v-guide 142 is attached to or possibly integrally formed with the inner surface 132 of the belt 131. With reference to FIGS. 35 to 40, the dual v-guide 142 comprises two elongate, parallel protrusions which are spaced laterally from each other. This lateral spacing provides a groove within which a wheel, sprocket pulley 146 or other track driving mechanism may reside and provide driving power to the endless track. The dual v-guide 142 serves to keep such a driving mechanism in line with the track 130 and prevents slipping out of the track 130 laterally. It is noted that the dual v-guide 142 may be continuous and extend around the track 130, or the track 130 may comprise a plurality of elongate parallel protrusions (equivalent to a dual v-guide 142 broken into a plurality of protrusion sections as shown in FIG. 41). In embodiments with a plurality of protrusion sections, the shape of the protrusion sections may be designed such that the driving mechanism doesn't snag on them when the protrusion sections engage the sides of the driving mechanism, for instance, by rounding or chamfering edges on the protrusion sections. Further, in such embodiments, the protrusion sections may be longitudinally spaced such that the driving mechanism, during operation, always has at least a portion of a protrusion section on either side of it. Furthermore, it will be appreciated that the dual v-guide 142 may comprise a different material from or the same material as the belt 131, and it may be integrally formed with or attached to the belt 131. The material of the dual v-guide 142 with C-section is a thermoplastic polyurethane molding compound. Its physical and mechanical properties are: specific gravity—1.136, tensile strength at break—6200 psi, tensile elongation at break—600%, tear strength—434 PLI, shore hardness—70.

Figure 40:
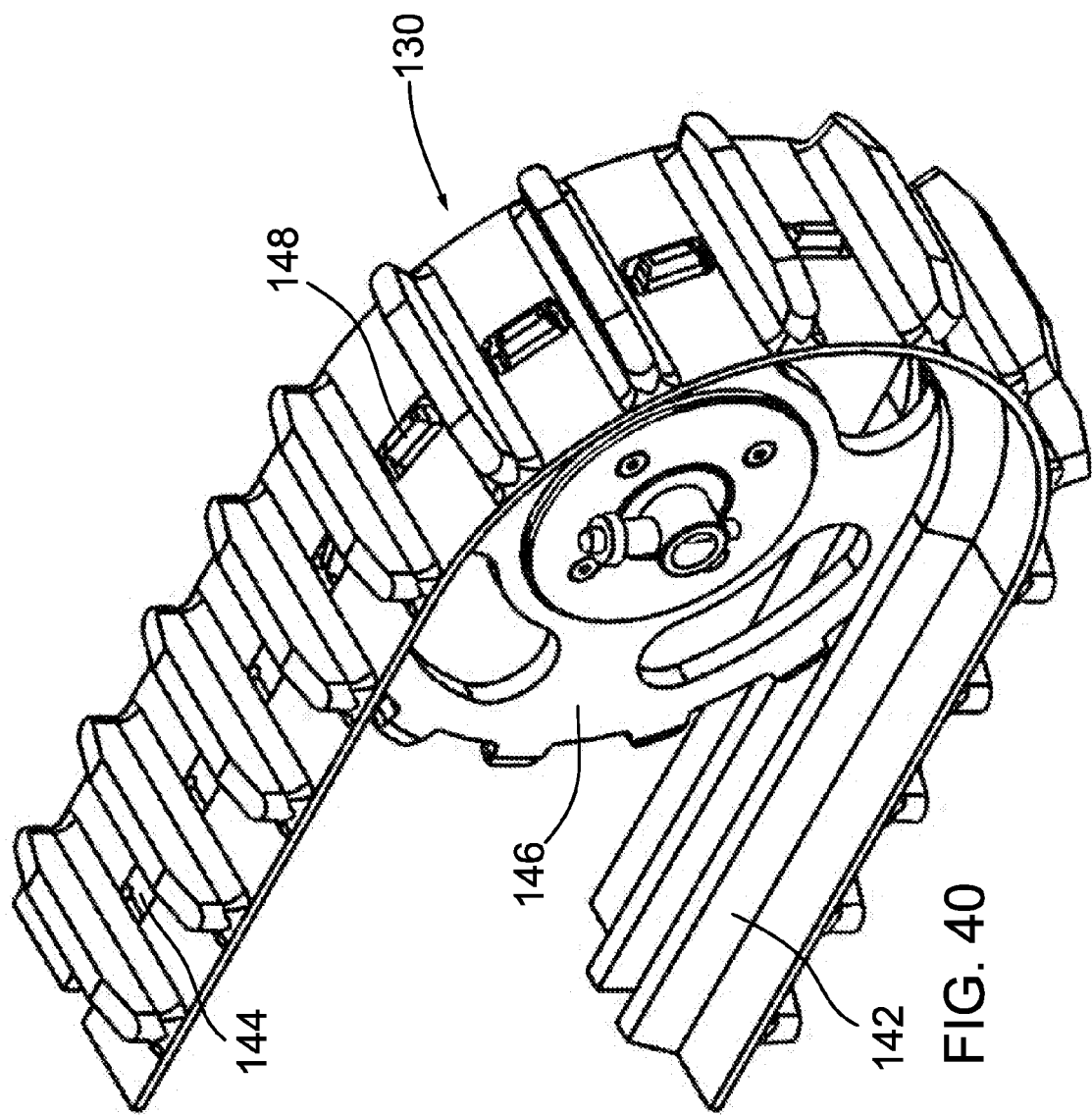
FIG. 40 is a perspective view of a the track and sprocket pulley of FIG. 39.
Figure 41:
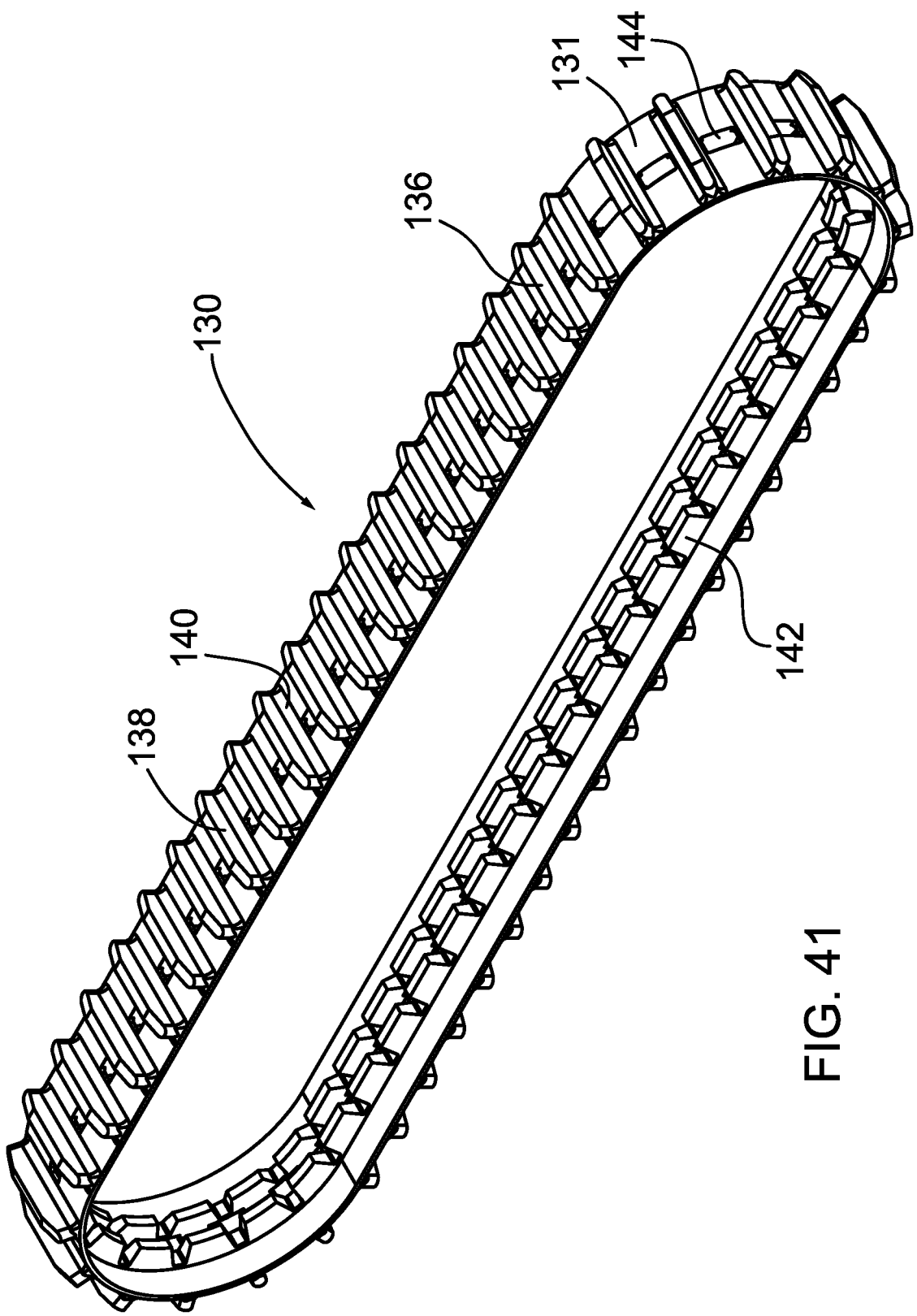
FIG. 41 is perspective view of an alternate embodiment of the track showing a plurality of elongate parallel protrusions.

In some embodiments, the track 130 may have holes 144 in between the cleats 136, as shown in FIGS. 35 to 40. The holes 144 are shaped to allow the teeth 148 of a driving sprocket pulley 146 to pass through them and to engage them for transmitting force to the track, as shown in FIG. 40. Such embodiments of the endless track prevent rotational slippage of the driving mechanism within the track, thus allowing much more force to be transmitted through them than in the case of a simple pulley drive mechanism. Further, embodiments of the endless track with holes 144 may be lighter than endless tracks with added inner lugs for engaging sprocket teeth 148. It will be appreciated that embodiments with holes 144 need not comprise a track 130 with material removed from it; for example, the track may comprise two belt halves which are attached to one another by the cleats 136 to form the track. Further, it will be appreciated that the track 130 may be reinforced in key locations, such as, for example, around the holes 144 or cleats 136. The track 130 may be made of any material known in the art to be suitable for use in an endless track; in non-limiting examples, it may comprise rubber, or urethane, or steel.

In this embodiment belt 131 is a TTA-1500 belt manufactured from NITTA Corporation. Belt 131 has a 2.4 mm thickness. Its major structure is composed of Nylon core and Nylon fabrics. Its properties includes: tensile strength—450 N/mm, elongation at break—25%, standard tension—1.0%, working load at 1%-22.5 N/mm, temperature range—−20 to +80° C., coefficient of friction (steel)—0.2 to 0.3.

In embodiments of the endless track with a continuous dual v-guide 142, each protrusion may be shaped such that it increases the second moment of area of the track to provide enhanced stiffness with very little additional mass. In such embodiments, it will be appreciated that tall and slender protrusions provide the highest gain in stiffness per additional mass. In embodiments the belt 131 comprises holes 144 to engaged sprocket teeth 148, the dual v-guide 142 may reinforce the track to compensate for the reduced stiffness due to the holes 144. Further, chamfered cleats 136 may be additionally included and positioned to reinforce the areas of the track having holes 144. In such embodiments, in addition to their primary functions, the dual v-guide 142 provides longitudinal bending stiffness to the track and the cleats 136 provide lateral bending stiffness to the track.

Track 130 is composed of belt 131, rubber cover with cleats 136, and V-guide 142. FIGS. 31 to 34 show the belt 131 and the rubber cover adhered together, this is the first step of the track 130 construction. The second step is punching holes 144 on the combination of the belt 131 and the rubber cover. The last step is to attach V-guide 144 on the belt 131 to make the track 130 as shown in FIGS. 35 to 40.

Figure 42:
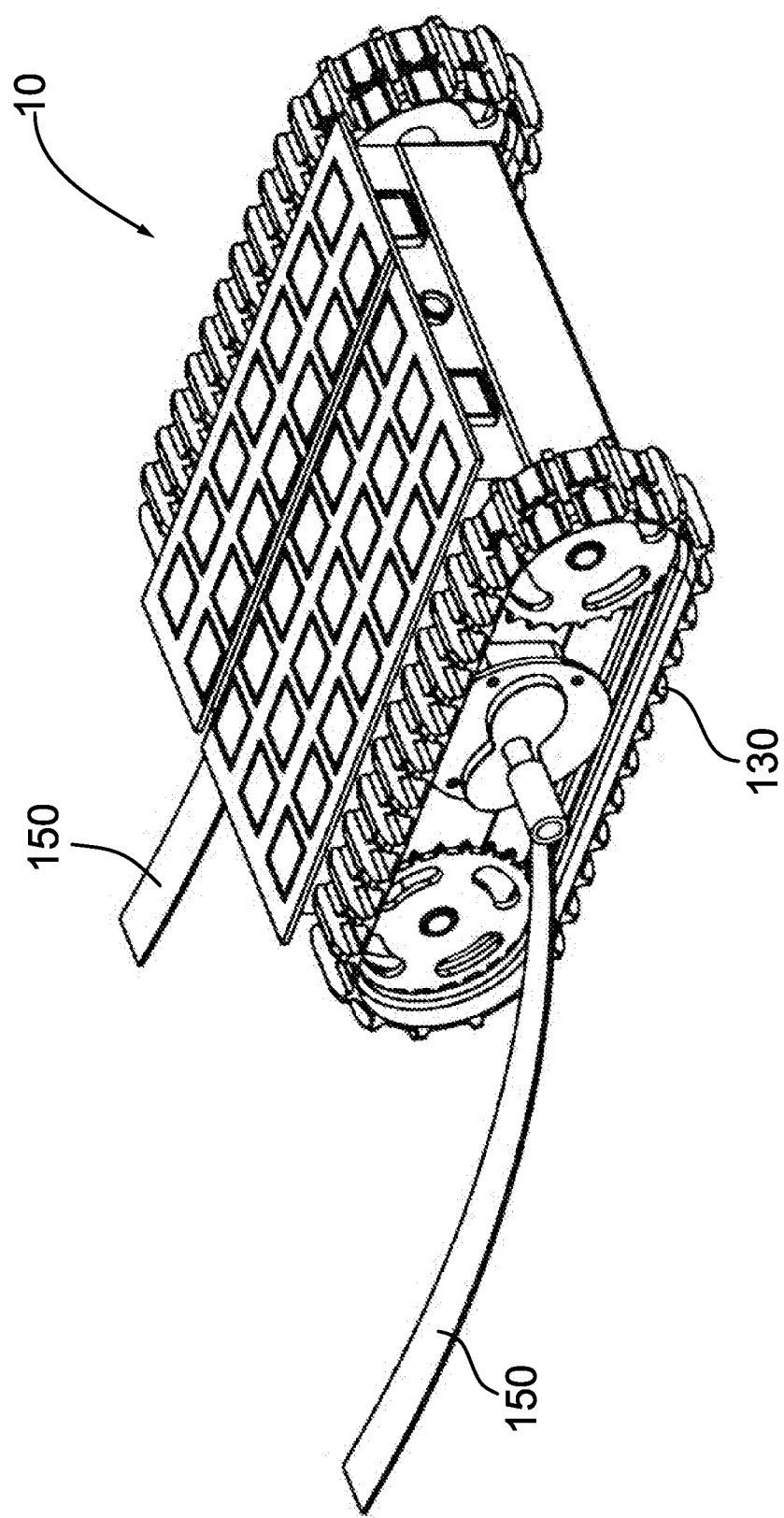
FIG. 42 is a perspective view of an alternate embodiment of the mobile robot including a flexible tail.
Figures 43A, 43B, 43C, 43D, 43E, 43F:
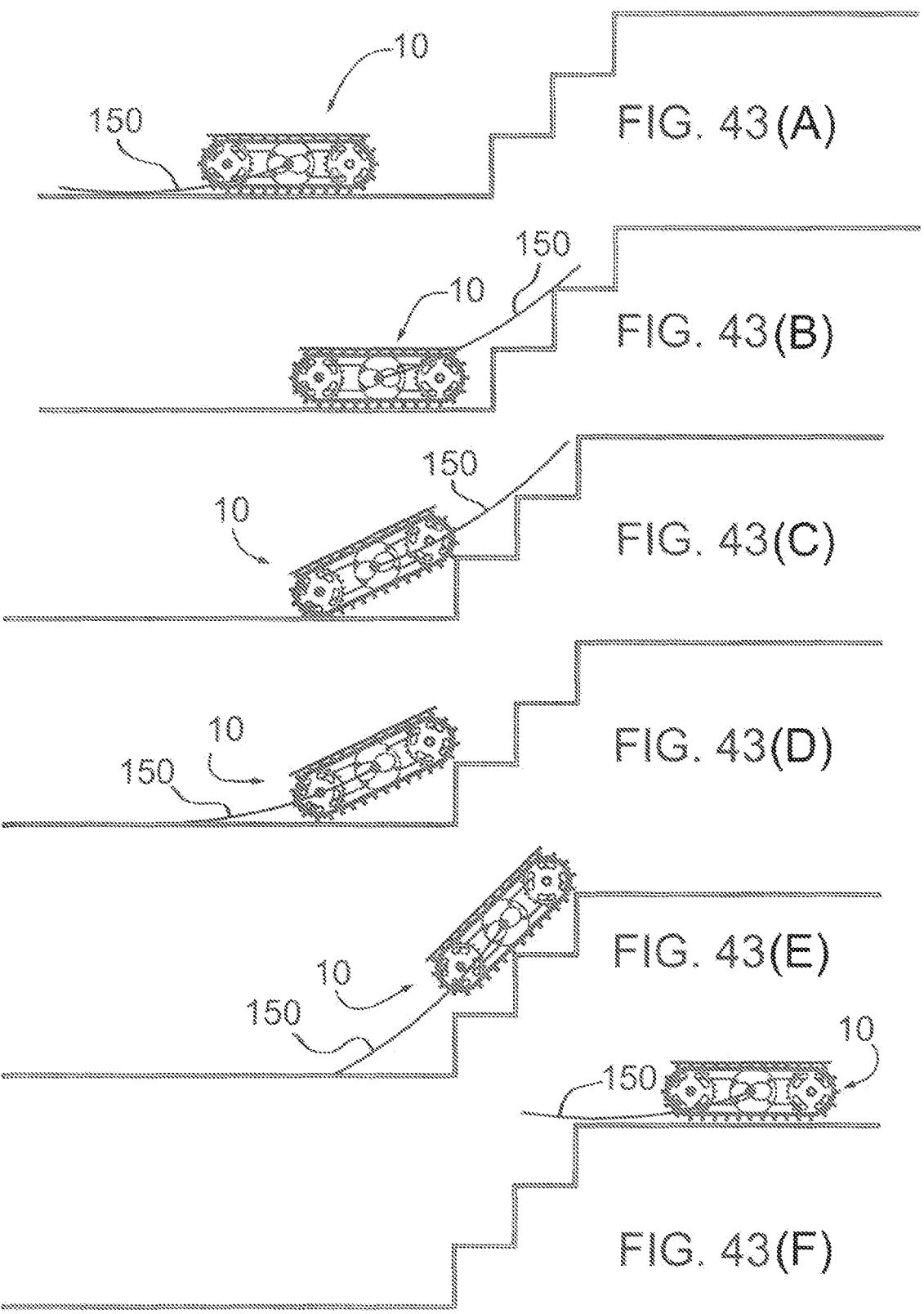
FIG. 43 (A) to (F) are a series of side views of the mobile robot of FIG. 42 shown on stairs, with (A) showing the mobile robot approaching the stairs, (B) showing the flexible tail in front of the robot on the stairs, (C) showing the tail in front of the robot as the robot starts to ascend the stairs, (D) showing the tail behind the robot as the robot starts to ascend the stairs, (E) showing the robot further up the stairs and (F) showing the robot at the top of the stairs.
Figure 44:
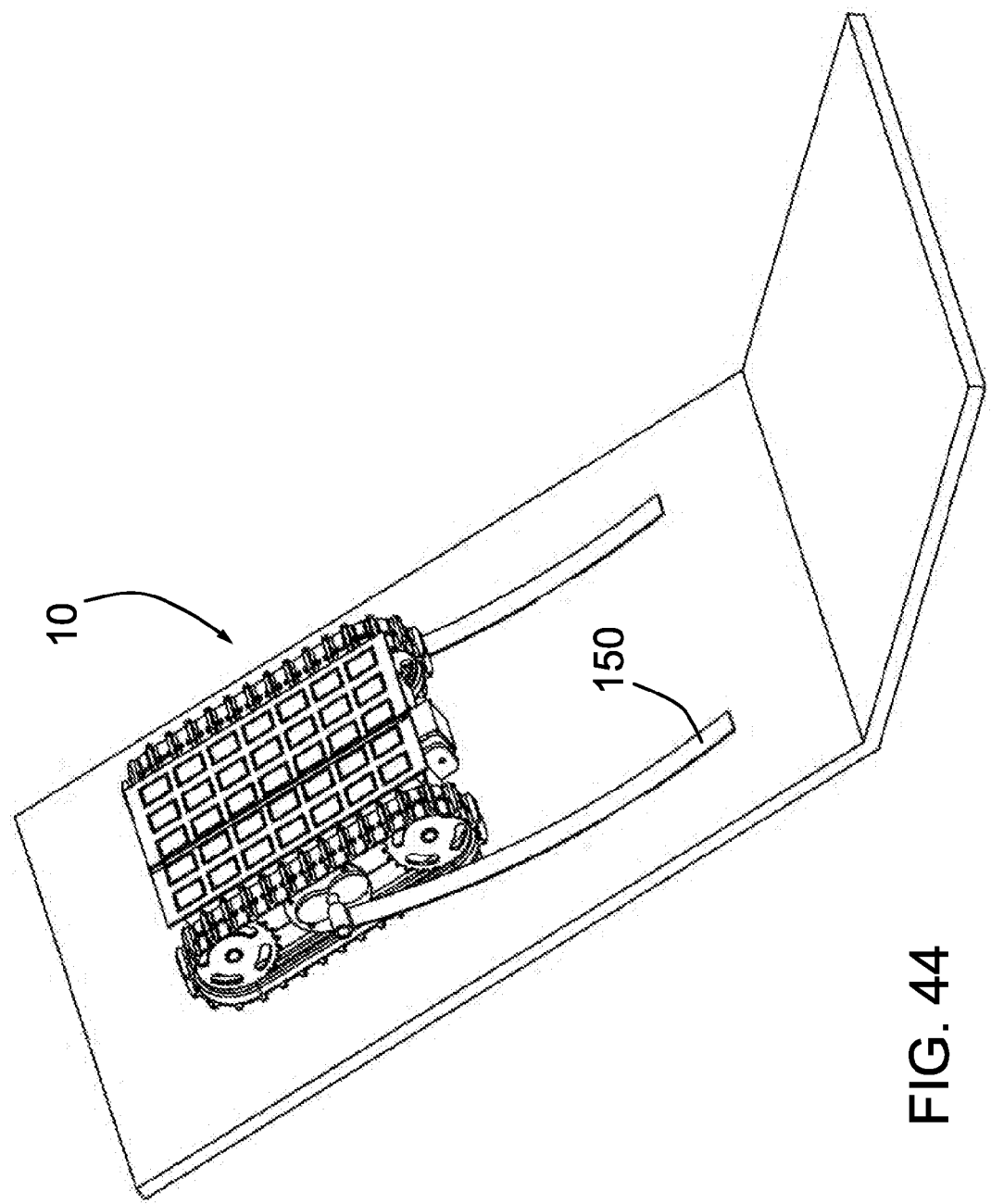
FIG. 44 is a perspective view of the mobile robot of FIG. 42 showing the use of the flexible tail on a slope.

As shown in FIGS. 42 to 44, a mobile robot is provided comprising a flexible tail 150 which is deployable in various directions extending outwardly from the mobile robot. In some embodiments, the flexible tail 150 is deployable in front of and behind the robot. The flexible tail 150 is attached to a deployment mechanism. In such embodiments, the tail 150 may be mounted to the robot in an actuatable rotatable manner such that upon actuation, the tail 150 changes its deployment direction from in front of the robot to behind the robot, or vice versa. The tail 150 may be rotatable about an axis parallel to a lateral direction to a robot, in which case the tail 150 flips over the robot when transitioning; or the tail 150 may be rotatable about an axis parallel to an upward direction from the robot, in which case the tail 150 may be deployable in front, behind, to the sides of the robot, and positions in between. The flexible tail 150 may be mounted to the robot in any way known in the art, such as but not limited to, on a disk, wheel, sprocket, gear, or shaft, and may be removable.

The flexible tail 150 may be made of any material, be of any length, and be of any cross sectional shape such that it can support itself as a cantilever beam. Usually, the determination of the flexible tail length (L) depends on: (1) the structure parameters of the platform such as the center distance (C) between the front and rear pulleys/wheels and the pulley/wheel diameter (D); (2) the obstacle height (H) to be surmounted, or stairs span (L') to be climbed. For example, if the design is required to climb the stairs with L' span, the flexible tail length L can be obtained based on the following equitation, $$L \geq \sqrt{\left(2L' - \frac{C}{2}\right)^2 + \frac{D^2}{4}} \qquad (1)$$

In non-limiting examples, the tail 150 may be made of any material which has sufficient strength, stiffness, and flexibility. It could be metal material such as alloy, spring steel, etc; or non-metal material such as fiber glass or rubber, and it may have a rectangular, circle, or elliptic cross section. For example, in the embodiment shown in FIGS. 42 to 44, the flexible tail 150 has a rectangular cross section and is made of spring steel. The tail 150 is attached at the centre (longitudinally) of the robot. In this embodiment, width of the tail 150 has been chosen to be much larger than its thickness; this prevents the tail 150 from bending laterally and keeps it in its preferred deployment direction relative to the robot when experiencing side loads, such as while the robot turns. It will be understood that the relative dimensions noted herein are included for didactic purposes and are non-limiting.

The flexible tail 150 provides a number of advantages for mobile robots. For example, when it is deployed or its deployment direction is changed by rotating it, it can be done in a rapid manner because of its ability to absorb energy by deforming. Thus, the flexible tail 150 will have a much lower chance of breaking itself or the robot it is attached to when it impacts a solid surface. In a similar scenario, if the flexible tail 150 is deployed ahead of a robot while the robot is driving forward, if the tail 150 contacts a solid object (e.g. a wall or a large rock), it will not transfer the impact energy directly to the robot, and will instead deform to absorb it. If the robot is dropped or it falls, the flexible tail 150 may absorb some of the impact energy thus cushioning the robot's fall. Further, the flexible tail 150 allows the centre of mass of a robot to change, and is compliant to uneven terrain when resting upon it, thus granting the robot a more stable stance on such uneven terrain.

It is noted that, when deployed in certain configurations (such as that shown in FIGS. 42 to 44), the flexible tail 150 may increase the friction experienced by the robot during turning. In embodiments with a robot comprising a flexible tail 150 and endless track as described in the foregoing, this friction can be reduced by using chamfered cleats 136 on the endless track. In such embodiments, the advantages of a flexible tail 150 can be achieved without the loss in locomotive efficiency when maneuvering the robot.

While the mobile robot shown in the figures is a robot, it will be understood by one skilled in the art that the mobile robot comprising the endless track and/or the flexible tail described herein may be any number of robots. In non-limiting examples, the mobile robot may be a robot; a construction robot such as a backhoe, bulldozer, or crane; a farm robot such as a harvester or tractor; a military robot such as a tank; or a robot for moving on snow.

Generally speaking, the systems described herein are directed to modular mobile robots, interchangeable features for use therein, a tooling arm for use therewith and an endless track for use therewith. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims. For purposes of teaching and not limitation, the illustrated embodiments are directed to a modular mobile robots, interchangeable features for use therein, a tooling arm for use therewith and an endless track for use therewith.

As used herein, the terms "having", "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

As used herein, the terms "substantially", "about" and "approximately", when used in conjunction with ranges of dimensions, compositions of mixtures or other physical properties or characteristics, is meant to cover slight variations that may exist in the upper and lower limits of the ranges of dimensions so as to not exclude embodiments where on average most of the dimensions are satisfied but where statistically dimensions may exist outside this region.

As used herein, the coordinating conjunction "and/or" is meant to be a selection between a logical disjunction and a logical conjunction of the adjacent words, phrases, or clauses. Specifically, the phrase "X and/or Y" is meant to be interpreted as "one or both of X and Y" wherein X and Y are any word, phrase, or clause.

As used herein the term "operably connected to" means that the two elements may be directly connected or indirectly connected that is they are connected through other elements.

As used herein, the word "longitudinal", when used in a context relating to a direction of motion of a track, means the direction or axis that a single track would travel along upon outfitting the track with one or more wheels, sprockets, pulleys or other rotational drive mechanisms, placing the track on a surface, and actuating those driving mechanisms. As used herein, the word "lateral", when used in a context relating to a direction of motion of a track, means a direction or axis parallel to the axis of rotation of a wheel, sprocket pulley or other rotational drive mechanism when placed within the track and actuated to drive the track. As used herein, the words "longitudinal" and "lateral", when used in the context of a robot, refer to the direction or axis along which a robot would travel without turning, and a direction or axis along a surface of travel perpendicular to that axis, respectively. As used herein, the term "chamfer" or variants refers to a sloping surface at an edge or corner, and does not imply any symmetry or particular angle which the sloped surface forms with any other surface.

What is claimed is:

1. A mobile robot fleet including a plurality of different sized mobile robots each mobile robot is for use with a control unit and the mobile robot fleet comprising:
    at least one interchangeable power and data distribution system;
    each of the plurality of different sized mobile robots having:
        a chassis having a predetermined size that is one of large robot, medium robot, small robot and back-packable robot and the large robot chassis is up to 139 by 66 cm, the medium robot chassis is up to 98 by 50 cm, the small robot chassis is up to 71 by 54 cm and the pack-packable robot chassis is up to 60 by 35 cm;
        drive system components operably attached to the chassis and having a predetermined size that is configured for use with the predetermined size of the chassis, the drive system components being configured for use with the interchangeable power and data distribution system;

power components having a predetermined size and being configured for use with the drive system components and being configured for use with the interchangeable power and data distributions system;

a main processor operably connected to the drive system components, the power and data distribution system and the power components; and a communication system operably connected to the drive system components, the power components and the main processor, the communication system is for communicating with the control unit; and wherein the interchangeable power and data distribution system is configured for use with at least two sizes of the chassis such that it is interchangeable therebetween.

2. The mobile robot fleet as claimed in claim 1 wherein the main processor, the communication system and the power and data distribution system are interchangeably useable in the large, medium, small and back-packable robots.

3. The mobile robot fleet as claimed in claim 2 wherein the drive system components include drive traction modules operably connected to drive transmission modules.

4. The mobile robot fleet as claimed in claim 3 wherein the drive system components further include flipper modules operably connected to flipper transmission modules.

5. The mobile robot fleet as claimed in claim 3 wherein the traction modules are one of long track traction modules, short track traction modules, or wheel traction modules.

6. The mobile robot fleet as claimed in claim 1 further including a core module and the main processor and communication system are part of the core module.

7. The mobile robot fleet as claimed in claim 6 further including a head module and the power and data distribution system is part of the head module.

8. The mobile robot fleet as claimed in claim 7 wherein the core module and the head module are each interchangeably useable in the large, medium, small and the back-packable robots.

9. The mobile robot fleet as claimed in claim 7 further includes one of a large gripper arm module, a small gripper arm module and a tooling arm.

10. The mobile robot fleet as claimed in claim 8 further includes a PTZ arm module.

11. The mobile robot fleet as claimed in claim 10 further including a camera and the camera is interchangeably attachable to the PTZ arm module, the large gripper arm module and the small gripper arm module.

12. The mobile robot fleet as claimed in claim 9 further including a turret attachable to one of the large gripper arm and the small gripper arm.

13. The mobile robot fleet as claimed in claim 10 further including a turret attachable to the PTZ arm module.

14. The mobile robot fleet as claimed in claim 1 further including weaponry that is interchangeably useable in the large, medium, small and back-packable robots.

15. The mobile robot fleet as claimed in claim 2 wherein the control unit is interchangeably useable in the large, medium, small and back-packable robots.

16. The mobile robot fleet as claimed in claim 2 wherein the power component is interchangeable useable with predetermined sized chassis smaller than the predetermined size chassis of the compatible power component.

17. The mobile robot fleet as claimed in claim 2 wherein the control unit is one of an operator controlled unit and an autonomously controlled unit.

18. The mobile robot fleet as claimed in claim 1 wherein the large robot weighs without payload up to generally 250 kg; the medium robot weighs without payload up to generally 125 kg; the small robot weighs without payload of up to generally 60 kg; and the back-packable robot weighs without payload of up to generally 15 kg.

* * * * *